United States Patent [19]
Cassano et al.

[11] 3,860,189
[45] Jan. 14, 1975

[54] PHOTORECEPTOR LOADING SYSTEM

[75] Inventors: James R. Cassano; Frank J. Sanza, both of Rochester, N.Y.

[73] Assignee: Xerox Corporation, Stamford, Conn.

[22] Filed: Sept. 25, 1972

[21] Appl. No.: 292,004

Related U.S. Application Data

[62] Division of Ser. No. 73,565, Sept. 18, 1970.

[52] U.S. Cl. ................................. 242/67.3, 226/91
[51] Int. Cl. ..................... B65h 17/02, B65h 17/22
[58] Field of Search ..... 242/67.3, 67.4, 67.5, 55.53, 242/75.51; 355/16, 11, 44, 45; 226/91, 113; 352/157

[56] References Cited
UNITED STATES PATENTS

| | | | |
|---|---|---|---|
| 2,998,905 | 9/1961 | Bieber | 242/67.3 |
| 3,395,385 | 7/1968 | Scoville | 242/75.51 |
| 3,397,628 | 8/1968 | Granzow et al. | 355/16 |
| 3,480,222 | 11/1969 | Goodman et al. | 242/55.53 |
| 3,600,082 | 8/1971 | Knechtel | 355/16 |

*Primary Examiner*—Billy S. Taylor

[57] ABSTRACT

Combination viewing and printing apparatus characterized by the capability of: producing a positive print from either a negative or a positive input film; printing on plain sheet paper which is fed from the apparatus at an optimum location; selecting the information to be printed from a microfilm transported by means of a differential drive arrangement which optimizes the film movement; accommodating various types of recording media, for example roll microfilm and microfiche; and presenting a plurality of image formats to the viewing screen and a recording media in a predetermined orientation convenient for viewing and printing.

14 Claims, 33 Drawing Figures

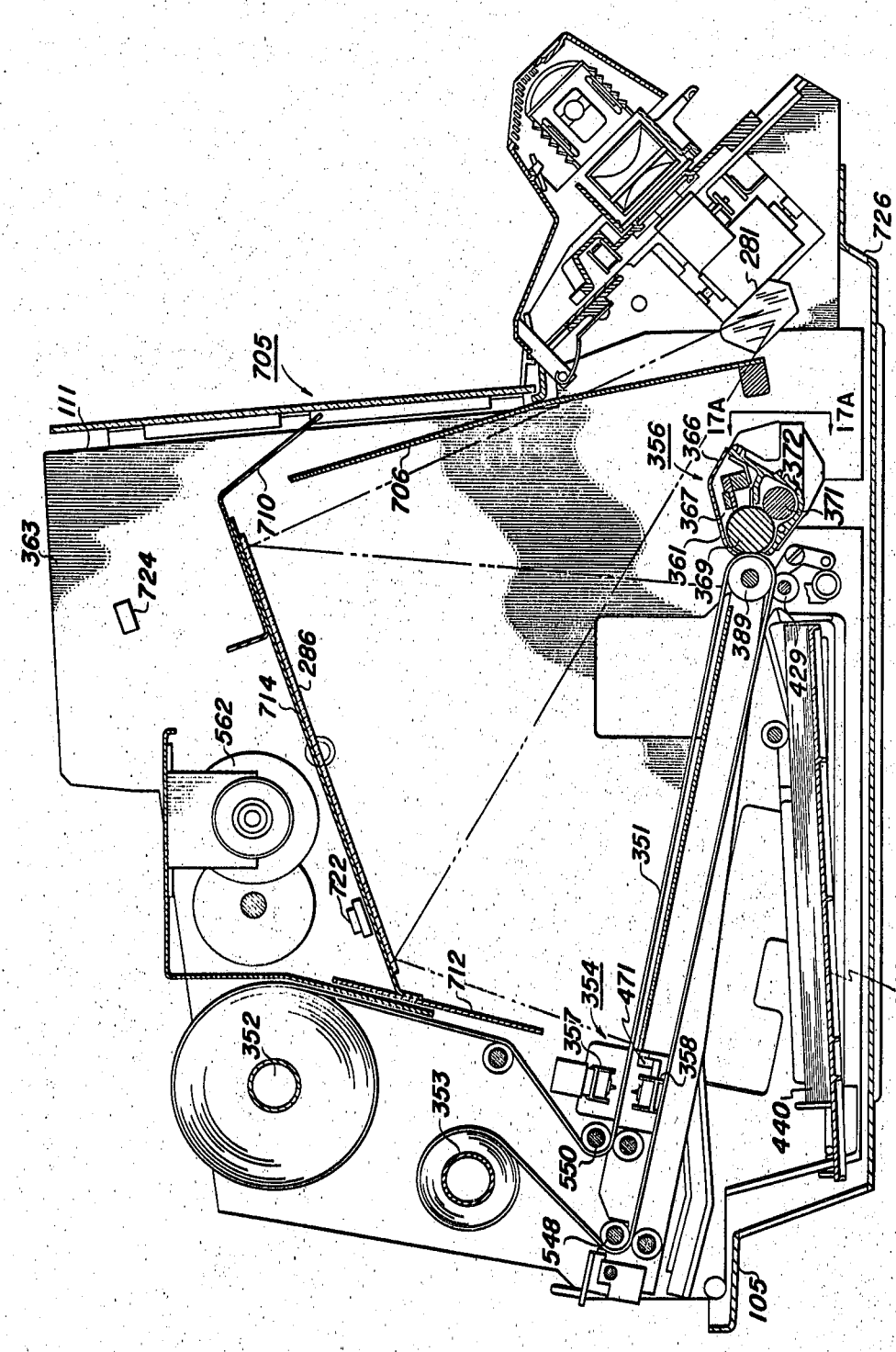

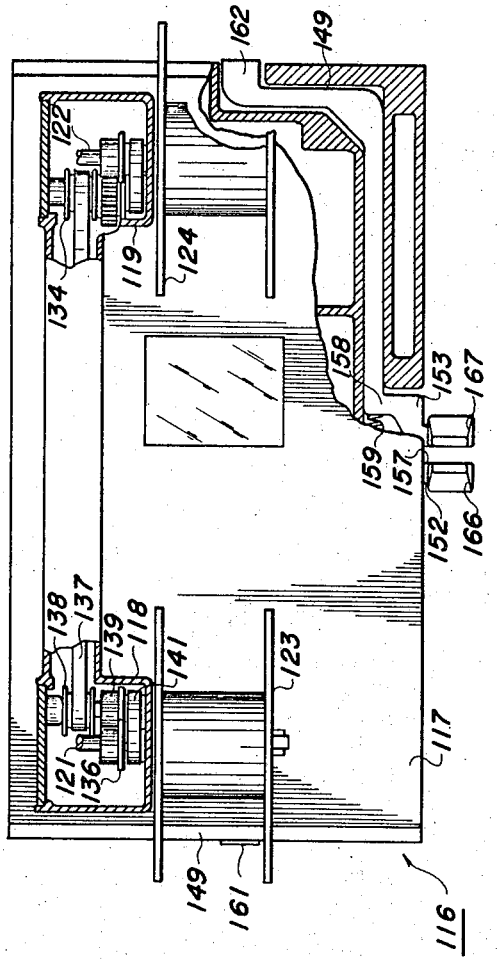

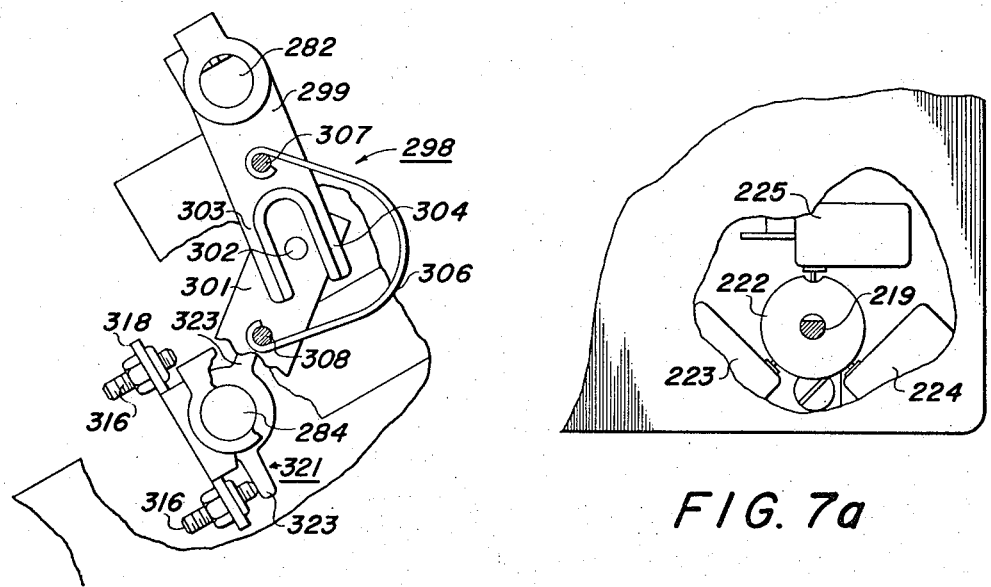
FIG. 10
FIG. 7a
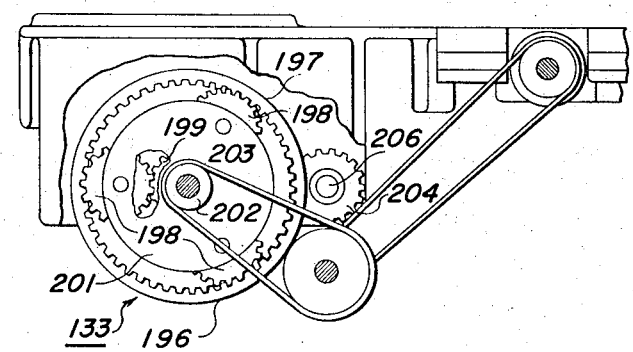
FIG. 9
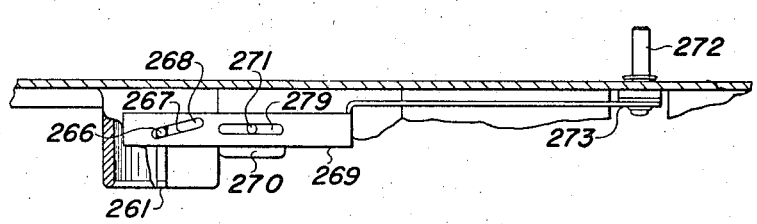
FIG. 13

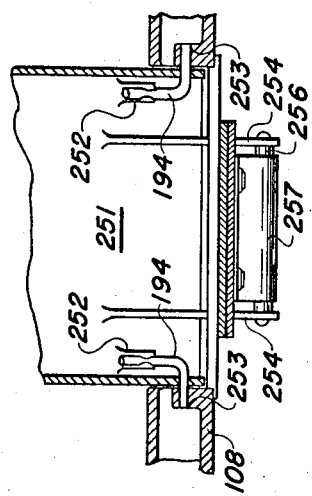
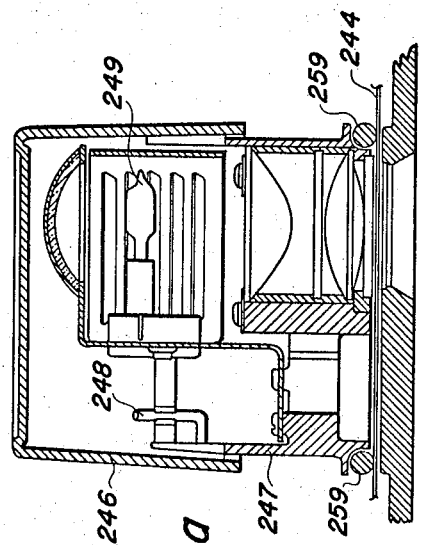
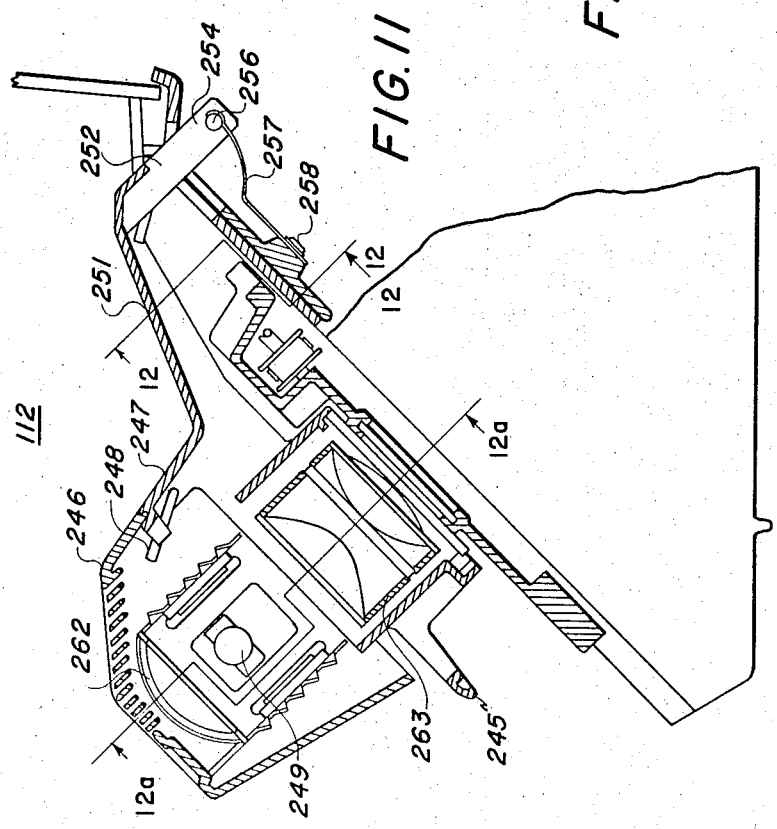

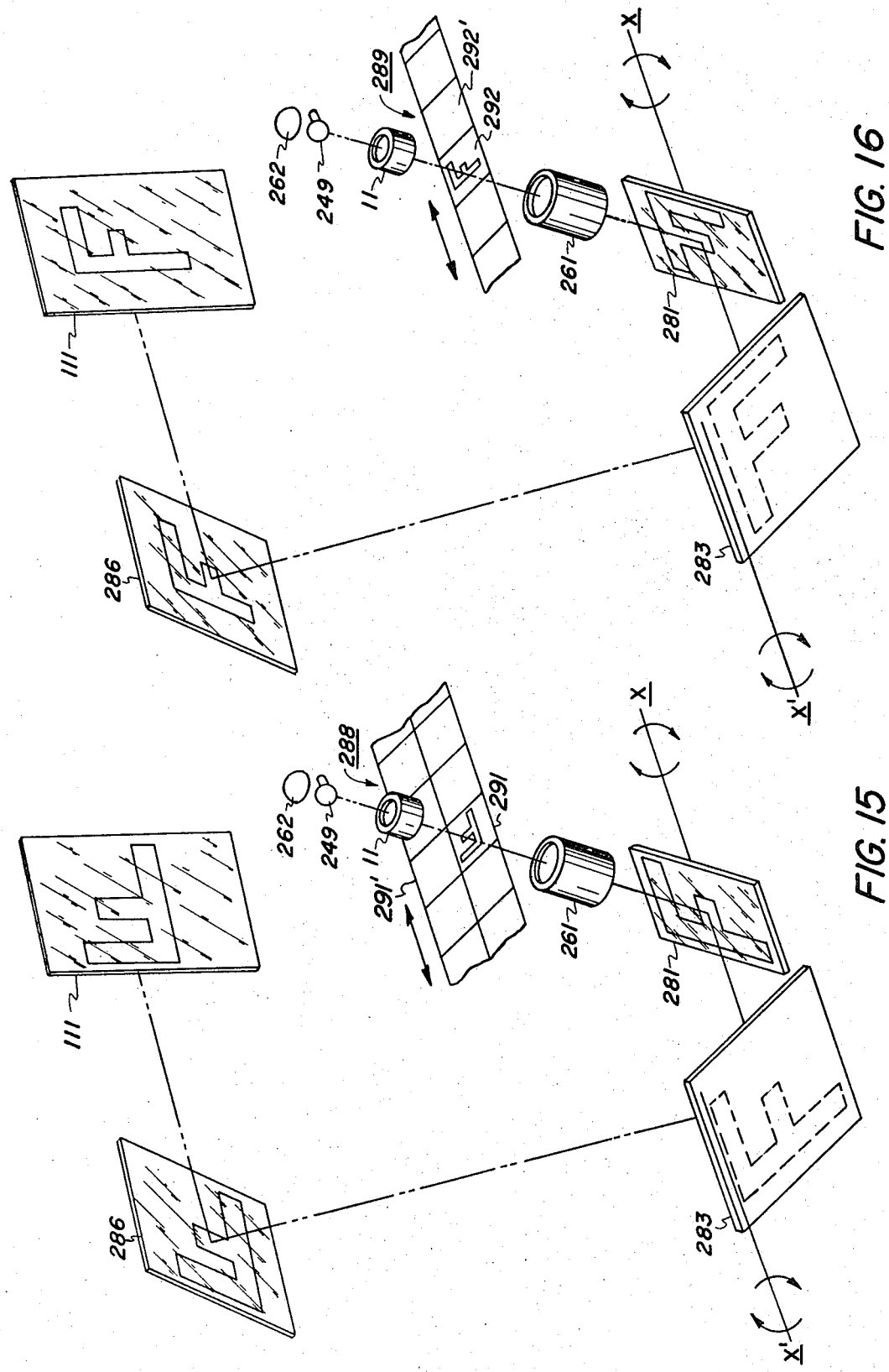

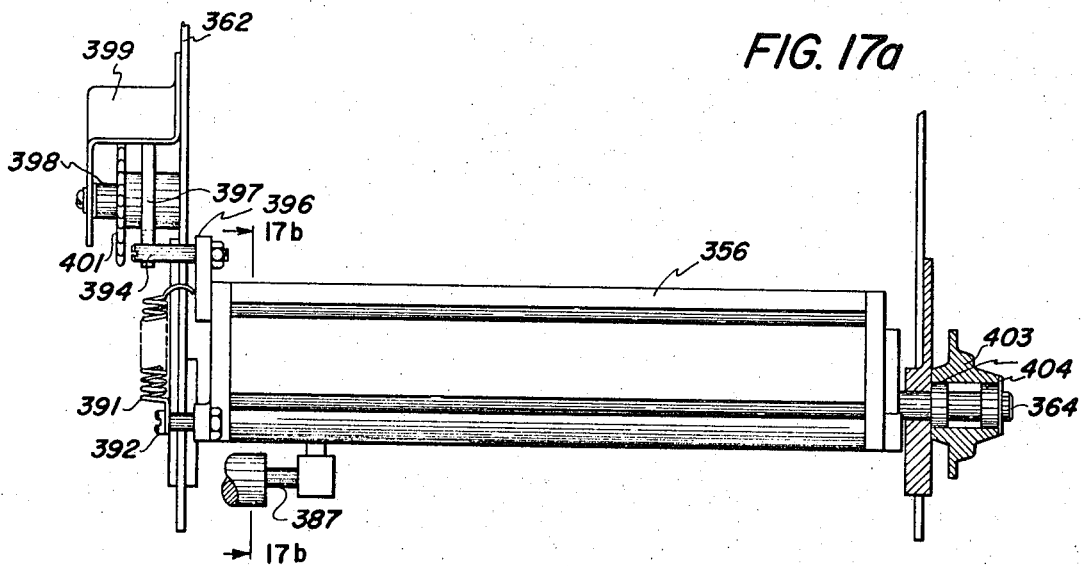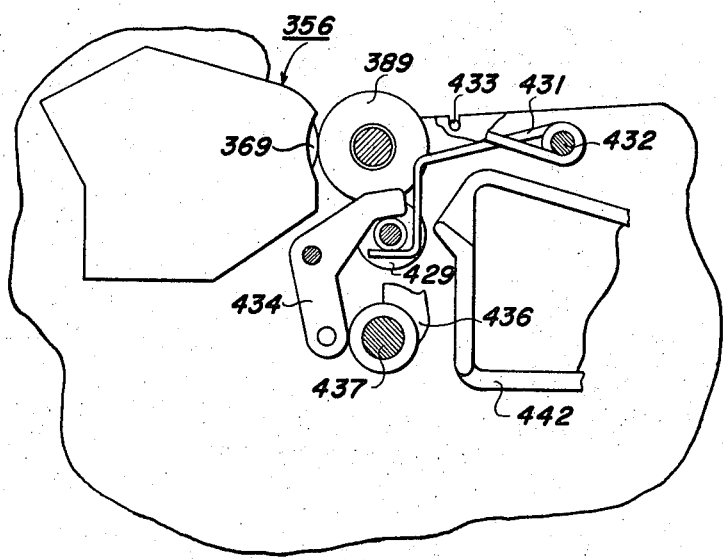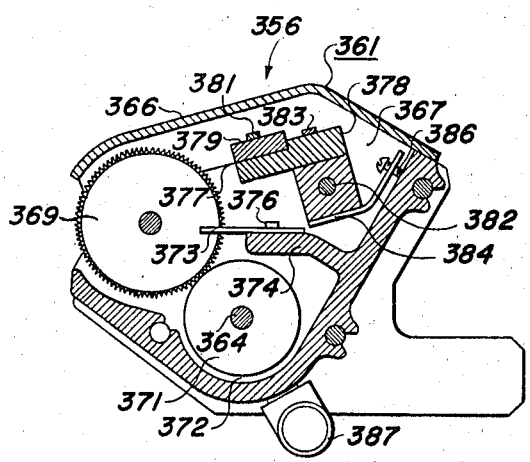

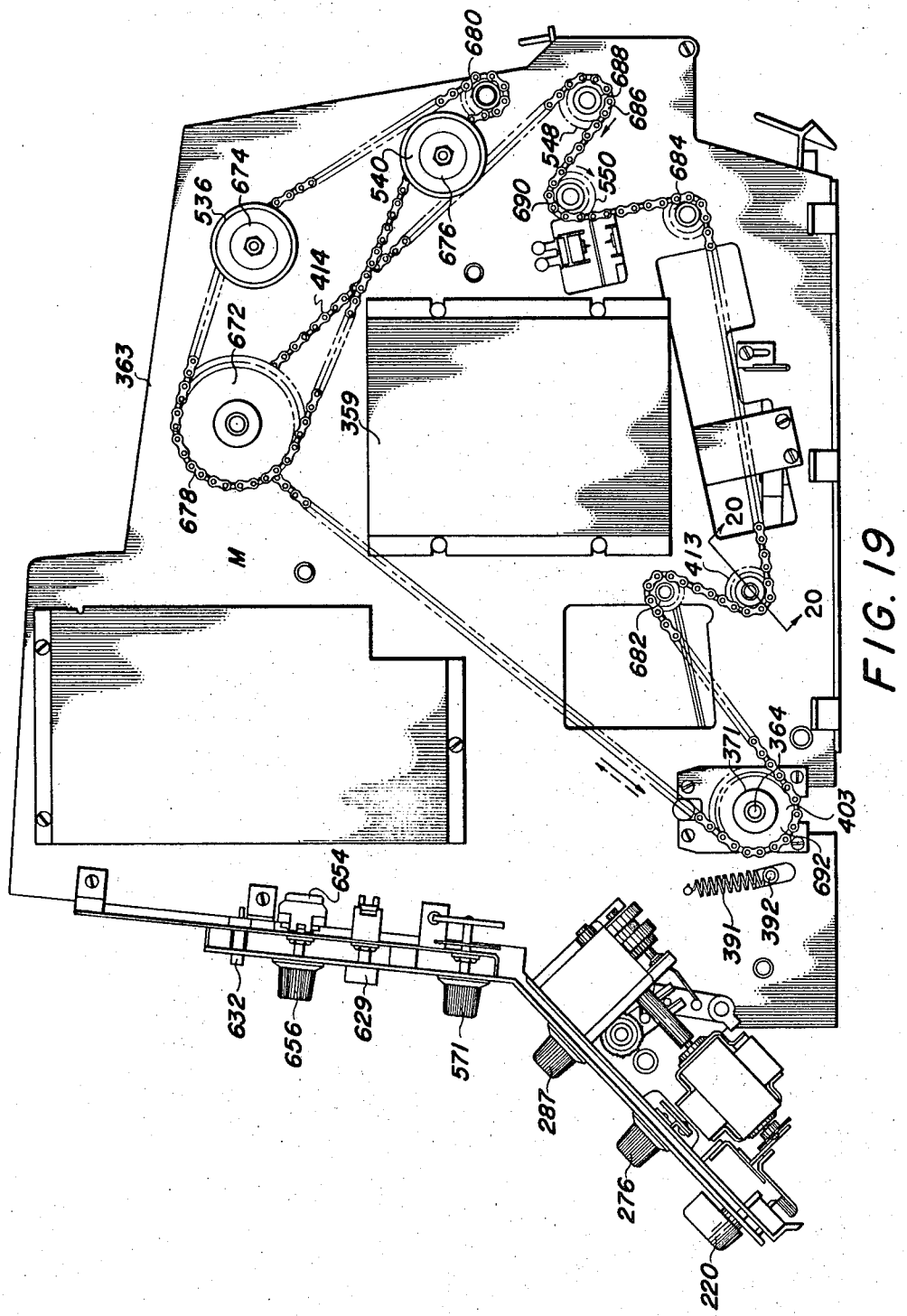

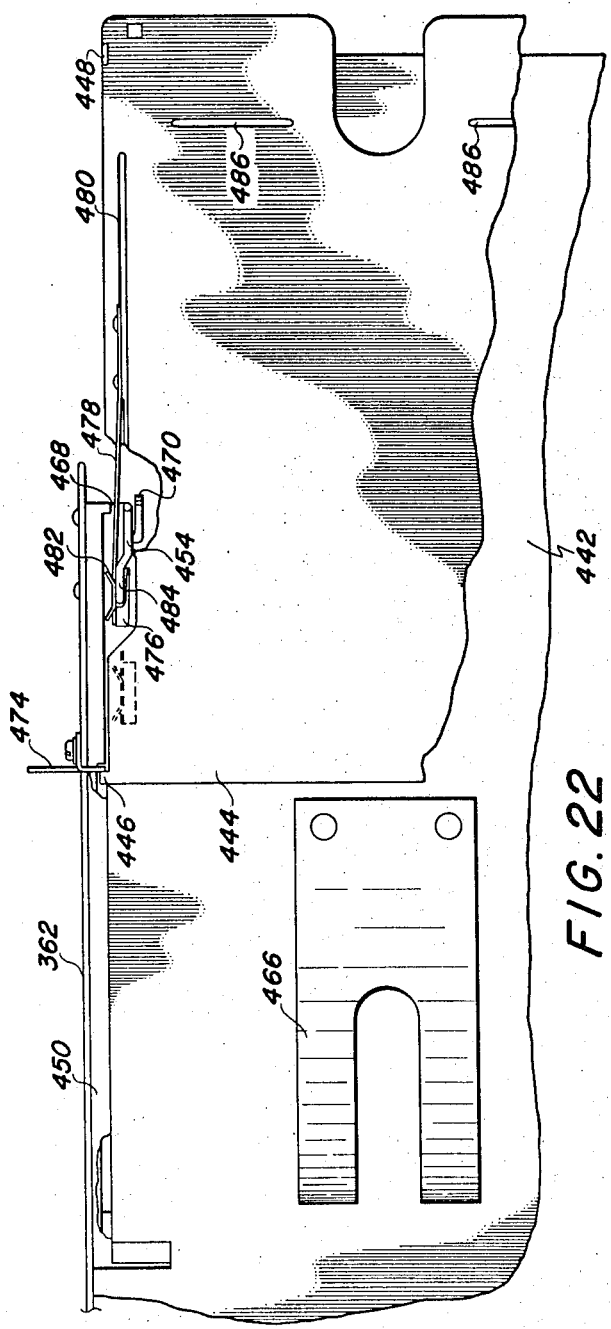
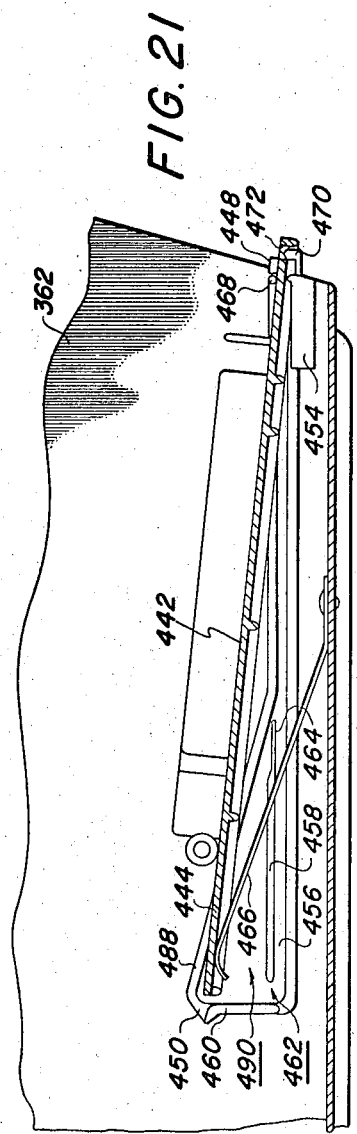

PHOTORECEPTOR LOADING SYSTEM

This is a division, of application Ser. No. 73,565, filed Sept. 18, 1970.

BACKGROUND OF THE INVENTION

This invention relates, in general to information retrieval and printing apparatus and, more particularly, to combination viewing and printing machines commonly referred to as "Reader-Printers" or "Microfilm Reader-Printers." The use of projection film readers in conjunction with information stored on microfilms has become quite popular in recent years, resulting in many refinements, the one having the most impact being the provision of means for making copies of selected portions of the microfilm. Such an addition to the basic machine, therefore, the "Reader," enables one to study the information at his leisure without tying up the recorder for extensive periods of time and to provide copies of the information to others if desired. The design of a satisfactory combination viewing and printing apparatus has been quite costly, and heretofore has fallen short of providing a machine with a wide degree of versatility without the need for complicated mechanisms and without inconvenience to the operator who in many cases is unfamiliar with the machine as in the case of coin operated installations.

For one reason or another microfilm records exist in both the positive and the negative form, consequently, it is quite desirable that a viewing machine having a printout facility, that is, the ability to make prints of any selected image, be able to make copies from both positive and negative records. Moreover, it is desirable to make a positive print regardless of the form of the input film. In other words, the machine preferably would possess the capability of providing a positive print from either a negative or a positive microfilm. Certain machines have such a capability, however, when the machine is set to operate in one mode, therefore, positive print from a positive input it cannot be switched over to the other mode of operation, therefore, positive print from a negative input, without changing the entire development system, which change, cannot be made by the layman thereby necessitating the call of the serviceman resulting in substantial delays. The gravity of the situation will be appreciated when considering the fact that the same set of records may contain both positive and negative forms. Where this is the case the machine obviously cannot be standardized for one mode of operation.

Not only do certain sets of microfilm records possess both positive and negative forms but they also consist of different formats, therefore, orientation of the information on the film strip. In one format the information is printed along the longitudinal axis of the film strip while in another it may be printed normal to the longitudinal axis. It should be apparent that the image must be projected onto the screen in an orientation at which the viewer may readily see and ascertain the nature of the projected image. This, therefore, requires that the image be projected on the viewing screen in a generally vertical orientation relative to the eye of the observer. Thus, where the projected image comprises printed information, the lines of printed material should extend horizontally on the screen relative to the eye of the observer. That is, the information should appear on the viewing screen in the same orientation that the viewer would normally utilize in viewing a book or any other printed information.

However, with conventional projection techniques, the orientation of the image projected upon the viewing screen is governed by the orientation of the image as it is recorded on the film. Therefore, with conventional projection techniques, the desired image orientation on the viewing screen is not always obtained for various film formats. For example, in some applications, the film transparency may comprise an elongated web of film material having images thereon which are transversely oriented with respect to the length of the film web. In other applications, the particular film material to be viewed may comprise an elongated web of film material having images thereon which are longitudinally oriented with respect to the length of the film material. In such applications, therefore, the desired image orientation on the viewing screen cannot be obtained for both film formats with the use of conventional projection techniques.

Previous attempts in overcoming this difficulty have included various arrangements by which the orientation of the film transparencies are selectively varied relative to the optical projection system to obtain the desired image orientation on the viewing screen. These arrangements have thus required complex film support structure. In systems where the film transparency material is in the form of an elongated web, the web material is generally supported on a supply reel and advanced past a projection station to a take-up reel by means of a film transport assembly. With such systems the film transport assembly has then been constructed in such a manner to permit the operator to position or reposition the entire transport assembly on which the film transparency web is supported in relation to the projection system so that the desired image orientation is obtained on the viewing screen. However, as should be apparent, such systems have required unnecessarily complex film transport assemblies and have unnecessarily complicated the operation of the machine.

More recent attempts at solving the problem of proper image orientation have led to the provision of optical systems wherein the image can be optically rotated through an angle of 360°, consequently, the film may possess any format and it would be possible to be projected onto the screen properly oriented. However, such machines either do not have the capability of providing a printout or they are designed for use with a printout accessory wherein the image is directly printed on a photocopying medium. In other words, image transfer is not possible.

The incompatibility of the first systems for optically rotating images with "image-transfer" printout systems and the expense thereof led to the development of a system wherein a mirror is rotated through an angle of 90° and cooperates with an intermediate mirror, in its rotated position, to rotate one format 90° and in its non-rotated position to project another format in the same orientation. Since the intermediate mirror is used in the one format only, the image is not only rotated but it becomes "reverse reading." In order to make the film "right reading", the spools carrying the microfilm must be removed, inverted and replaced on the machine which is an inconvenience to the operator, especially if both formats are used on the same film. This also causes additional complication and expense in designing the film drive system whether manual or automatic.

Four modes of driving would be required, therefore, both the supply reel and the take-up reel would have to each drive in the clockwise and counterclockwise direction. Another ramification of such a system is the difference in magnification for each mode which would require two magnifications.

The film transport or viewing apparatus of the type used for information retrieval must be capable of moving the film material smoothly from one spool to the other, particularly at low speeds, since this is when the operator has to determine what portions of the film are of interest. Film that moves in a "jerking" manner is both annoying to the operator and potentially harmful to the film, if it should be old and fragile or "spill" off the spools.

The most common speed controls associated with mechanisms of the type herein contemplated utilize solid state speed control circuitry including an SCR or a braking arrangement which acts directly on the gear train driving the film reels, the former of which is quite expensive and the latter of which produces variable torque and therefore "jerky" film movement. Another difficulty with braking applied directly to the gear train is the undesirable load on the motor which tends to shorten the life thereof.

Accordingly, the primary object of this invention is to provide a new and improved film viewing apparatus having a selective printout capability.

It is a more particular object of this invention to provide a new and improved film viewing apparatus with printout which produces a positive print from either a positive or a negative input film.

Another object of this invention is to provide a new and improved film viewing apparatus in which print mode selection (i.e., positive to positive or negative to positive) can be easily and quickly made by an unskilled operator.

Still another object of this invention is to provide a new and improved combination reader-printer which is convenient to operate and inexpensive to maintain.

Yet another object of this invention is to provide a new and improved reader-printer which utilizes plain sheet for making permanent copies.

Another object of this invention is to provide a new and improved projection system for a viewing apparatus.

Another object of the present invention is to provide, in a film viewing apparatus, a system wherein the orientation of the viewable image may be selectively varied for various film formats without a corresponding variation in the orientation of the film material.

It is another object of the present invention to provide a new and improved system for optically rotating a film format to provide for proper viewing orientation.

Another object of this invention is to provide means for optically rotating an image of a film material that is compatible with image transfer type of printing.

Another object of this invention is to provide a new and improved arrangement for supporting film material at the projection station of a film viewing device.

Another object of this invention is to provide a new and improved mechanism for moving an elongated web of film past a projection station.

A further object of this invention is to provide an improved film supporting and transporting structure which facilitates selective positioning of the film material within the optical projection path in the transverse direction relative to the direction of film travel without interrupting the movement of the film from one reel to another.

A still further object of this invention is to provide a modularized film supporting and/or supporting and transporting structure for one form of film which may be readily interchanged with a module supporting another form of film, for example a microfiche.

Another object of this invention is to provide, in a combination reader-printer, a new and improved method of reproducing an image from a film material.

Yet another object of this invention is to provide a new and improved method of loading and supporting a disposable photoreceptor in a copying machine.

Still another object of the invention is to provide a new and improved structure for supporting copy paper in an image transfer type of recording system.

Another object of this invention is to provide a new and improved method of supporting copy paper for use in an image transfer type of recording system.

BRIEF DESCRIPTION OF THE INVENTION

Briefly, the above cited objects are accomplished by provision of a xerographic printer using a liquid development system with a gravure roller applicator. When such a structure is pressed in contact with a smooth xerographic plate, the non-inked peaks contact the smooth surface while the developer film disposed in the depressions does not. The charge constituting a latent electrostatic image or simply the charged areas on the smooth surface attract the ink so that it moves into contact with the plate. Development of the uncharged areas can be accomplished through closure of a switch which serves to apply a potential of the same polarity and of the same amount as the charged areas on the surface. This causes developer material to deposit out in uncharged background areas. The switch actuator is conveniently located at the front of the machine. Development of the charged areas corresponds to the positive to positive mode while development of the uncharged areas corresponds to the negative to positive mode of operation.

A pair of rotatable mirrors is provided for optically rotating an image of a first film format to project an upright and wrong reading image onto the rear surface of the viewing screen or in a print mode to a photoreceptor surface. An image representing a second format can be projected onto the rear surface of the viewing screen without the mirrors being rotated. An important feature of this mirror arrangement is the presentation of an upright and wrong reading image to the viewing screen which when viewed from the front of the screen appears as an upright and right reading image. Moreover, the upright and wrong reading image presented to the photoreceptor is properly oriented for image transfer to a sheet of plain copy paper.

The drive mechanism for transporting a film material comprises a differential gear arrangement, the output of which serves as the input to a gear and belt drive system which drives either the take-up or the supply reel depending upon the direction of rotation of the output from the differential. A pair of motors constituting the inputs to the differential cooperate therewith to produce a constant torque at a relatively low difference in motor speeds while the motors are running near their maximum speeds.

To facilitate loading of a disposable photoreceptor and support thereof after installation, a photoreceptor drawer structure is provided. The drawer structure supports a plurality of roller members over or around which the photoreceptor moves during its movement through an exposure and print cycle. The rollers carried by the drawer cooperate with permanently supported rollers mounted between two side supports of the machine. When the drawer is retracted from the machine, the leading edge of the photoreceptor is dropped in front of the leading roller of the drawer and held while the drawer is moved into the machine which has the effect of unwinding the photoreceptor web from the supply reel which is supported above the drawer structure. Once the drawer is substantially installed the leading edge of the photoreceptor is inserted between a pair of take-up yokes. Such an arrangement avoids the otherwise troublesome threading of the photoreceptor through the interior of the machine.

Feeding of copy paper is accomplished by means of an electromagnetic clutch and feed shaft arrangement which moves the copy paper at a predetermined time, toward the front of the machine adjacent the bottom thereof so that the copy exits from the machine at a convenient location. The feed shaft is disposed adjacent the front of a paper supporting platform which is pivotally supported adjacent its rear edge and biased upwardly at its front edge in the area of the feed shaft for insuring proper engagement between the paper and the feed shaft.

DESCRIPTION OF THE DRAWINGS

FIG. 2 is a right side elevational view from the inside of the device shown in FIG. 1;

FIG. 3 is a top plan view, partly broken away, of a film transport module incorporated in the invention;

FIG. 3a is a front elevational view, partly broken away, of the module shown in FIG. 2;

FIG. 4 is a plan view partially broken away, as viewed from the right of FIG. 3;

FIG. 7a is a fragmentary view of a switch and cam arrangement forming a part of the drive shown in FIG. 7;

FIG. 9 is a rear elevational view, partly broken away, of the drive arrangement shown in FIG. 7;

FIG. 10 is an enlarged fragmentary view of a linkage arrangement associated with image rotation structure forming a part of the invention;

FIG. 11 is a view enlarged plan of the lens system of the reader/printer of FIG. 1;

FIG. 12 is a view taken along the line XII—XII of FIG. 11;

FIG. 12a is a view taken along the line 12a—12a of FIG. 11;

FIG. 13 is a cross-sectional view taken along XIII—XIII of FIG. 8;

FIG. 15 is a schematic illustration in perspective of an image rotation system in a second mode of operation;

FIG. 16 is a schematic illustration in perspective of the system shown in FIG. 15 but with a different film format;

FIG. 17 is a fragmentary view ilustrating an image development and transfer station forming a part of the invention;

FIG. 17a is a view taken along the line 17a—17a of FIG. 2;

FIG. 17b is a view taken along the line 17b—17b of FIG. 17a;

FIG. 19 is an elevational view of the right support structure of the machine shown in FIG. 1;

FIG. 21 is a side elevational view of a paper feed mechanism forming a part of the invention;

FIG. 22 is a fragmentary top plan view of the mechanism shown in FIG. 21;

DESCRIPTION OF THE PREFERRED EMBODIMENT OF THE INVENTION

Figure 1:
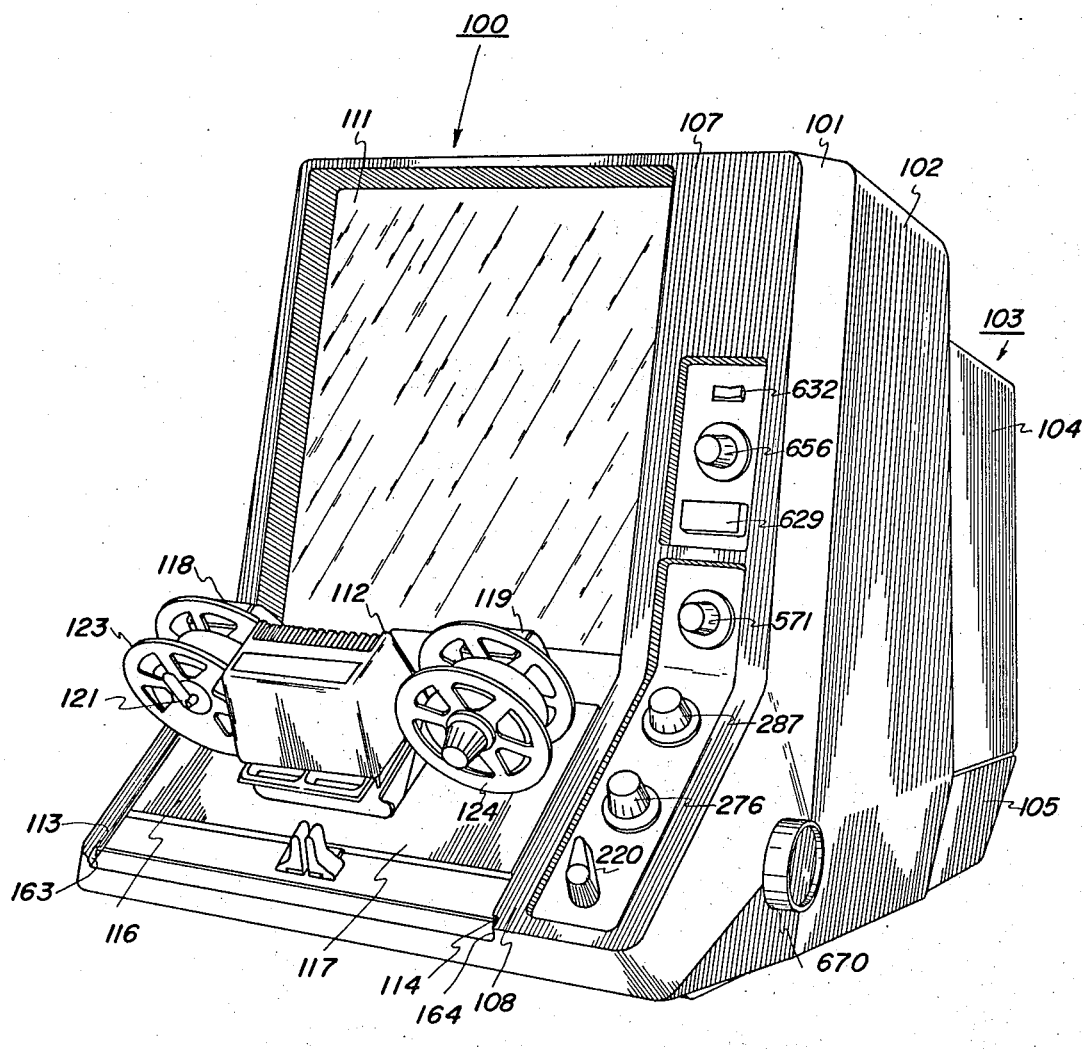
FIG. 1 is a perspective view of a combination reader/printer representing the invention.

Referring to the drawings, especially to FIG. 1, reference character 100 designates generally a film viewing and printing apparatus comprising front, middle and rear sections 101, 102 and 103. The rear section 103 comprises an access cover 104 and a base member 105, the latter of which supports the former and extends forwardly beneath the middle section 102. The front section 101 comprises adjacent sloping wall structures 107 and 108 the former of which is provided with a viewing screen 111 and the latter of which pivotally supports a lamp housing 112, past which, film is moved in order to project information carrier thereby to the screen 111 in a manner to be described hereinafter. The wall structure 108 has a pair of opposed grooves 113 and 114 for removably receiving a film transport module 116, see FIGS. 3, 3a, and 4.

A mirror arrangement 264 for optically rotating the image for projection (along a path indicated by solid lines) to the screen 111 in a predetermined orientation is also used in conjunction with the tiltable mirror 286 to project an image along a path indicated by broken lines of either A or B type format to a photosensitive surface herein disclosed as a single-use photoreceptor 351 (See FIG. 2). The photoreceptor may be made from any suitable material, for example, phthalocyanine, coated paper provided in the form of an elongated web wound on a supply reel 352. A reel 353 is provided for use as a take-up means for used photoreceptor material. Intermediate the reels 352 and 353, along the path of travel therebetween, are a charging device generally indicated by reference character 354 and a developer structure 356.

The charging device 354 comprises an upper corotron 357 and a lower corotron 358 between which the photoreceptor 351 passes. The upper corotron is energized by means of a power supply 359 (FIGS. 19 and 26) so as to place a positive charge on the top of the photoreceptor 351 while the lower corotron is energized so as to place a negative charge at the bottom thereof. It will be apparent that the foregoing arrangement provides a suitable charging device without the necessity of a backing electrode.

Although other charging devices known to those skilled in the art may be utilized, it is preferable to charge the photosensitive web by corona discharge from a wire filament or wire filament array which is maintained at high potential as described, for example, in U.S. Pat. No. 2,588,699 to Carlson, 2,836,726 to Vyverberg, 2,777,957 to Walkup, 2,778,946 to Mayo, and others.

The power supply for the corona charging unit may be of any construction well known in the art which provides approximately 7,000 volts D. C. from a commercial outlet of 110 volts, 60 cycle alternating current.

The photoreceptor web 351, as mentioned hereinabove, is first charged by the charging device 354, before engagement with the developer roller 369. While the photoreceptor is being charged the developer roll 369, which is disengaged from the photoreceptor 351, is primed through its rotation of a sprocket 403 mounted on the shaft 364 by means of a one-way clutch and bearing arrangement 404. In the direction of positive drive between the sprocket 403 and the shaft 364 the feed roll 371 is rotated thereby carrying the developer from the reservoir to the applicator surface of the developer roll, the feed roll being drivingly connected to the developer roll by a mating gear arrangement, not shown.

Figure 7:
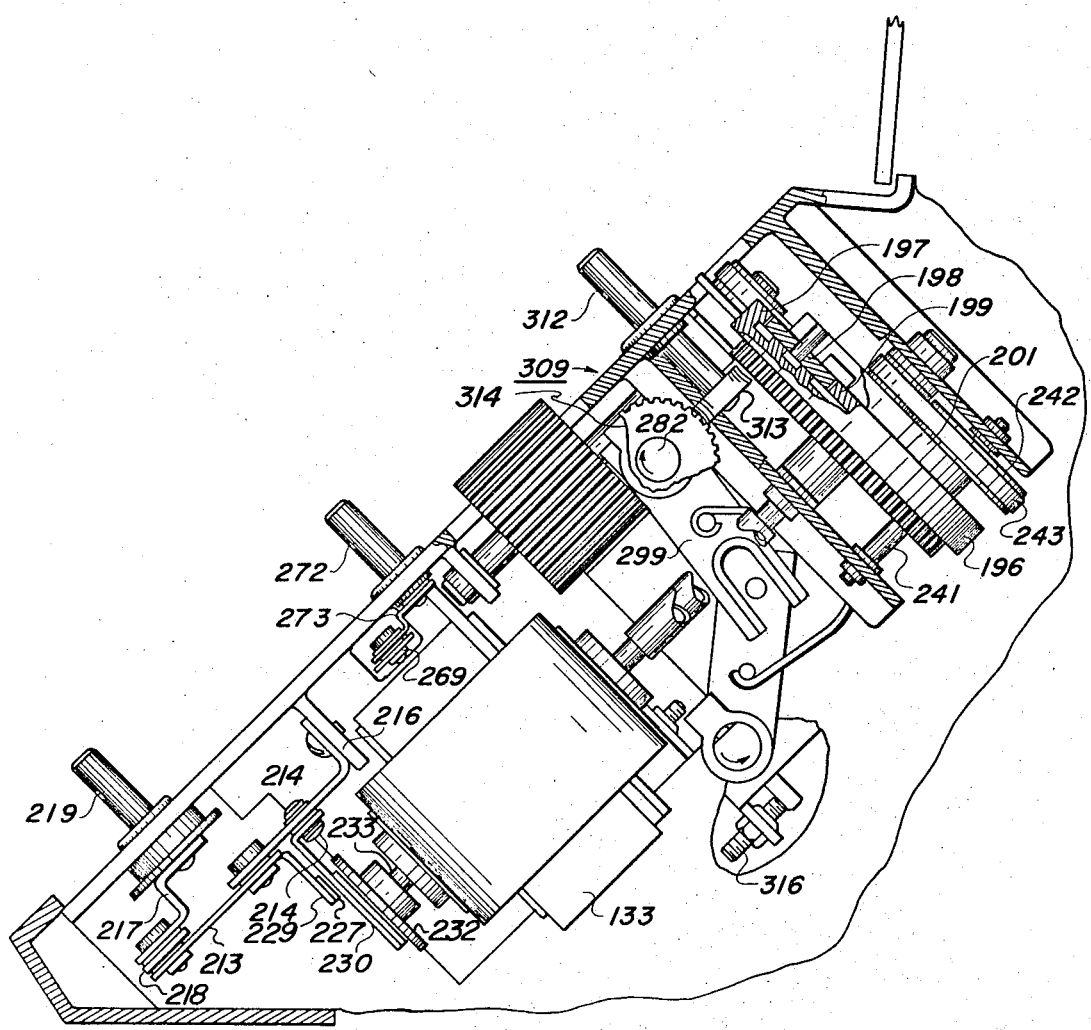
FIG. 7 is a side elevational view of a drive arrangement forming a part of the invention.

As shown in FIGS. 3, 3a and 4, the module 116 comprises a base 117 having integral therewith a pair of spindle housings 118 and 119. The housings 118 and 119, respectively, support a supply spindle 121 and a take-up spindle 122 which, in turn, respectively support a take-up reel 123 and a supply reel 124. The spindles serve to spool film past the lamp housing 112 in both directions, consequently the foregoing designations are used solely for reference purposes. The film which is manually attached to the take-up reel is moved onto the supply reel through movement of the supply spindle in a counterclockwise direction as viewed in FIG. 3a. This is accomplished by means of a vertically oriented endless belt 126 drivingly connecting a spindle pulley 127 to a pulley 128, the latter of which is supported by a shaft 129 suitably journaled in the spindle housing 119 (see FIG. 4). Rotation of the shaft 129 is provided through a clutch member in the form of a gear 131 secured thereto and drivingly engaged by a gear 132 representing the output of a differential drive mechanism generally indicated at 133 (FIG. 7).

Winding of film onto the take-up reel 123 is accomplished through clockwise rotation, as viewed in FIG. 3a of the gear 131 which causes rotation in the same direction of the pulley 134 carried by the shaft 129. The pulley 134 is drivingly connected to a spindle pulley 136 via a transversely extending and horizontally disposed endless belt 137, idler pulleys 138 and 139 and a vertically oriented belt 141.

The gear 131 is shiftable along the longitudinal axis of the shaft 129, shifting being accomplished through cooperation of a helix 142 carried by the shaft 129 in a recess in the form of a helix provided internally of the gear 131. The direction of rotation of the gear determines the direction of shifting. To provide alternate frictional drive, between the gear 131 and the pulleys 128 and 134 the faces of the gear 131 are provided with friction pads 144 and 146 and the adjacent faces of the pulleys 128 and 134 are provided with friction pads 147 and 148 (FIG. 4). The friction pads which may be made from any suitable material, for example, cork, are suitably secured to the aforementioned faces. Clockwise rotation of the gear 131 as viewed in FIG. 3a, will cause shifting thereof from the front to rear as viewed in FIG. 4 thereby effecting a driving relationship between the gear 131 and the pulley 134. Reverse rotation, obviously, will cause shifting of the gear 131 in the opposite direction to thereby effect a driving relationship between the gear 131 and the pulley 128.

As can best be seen in FIG. 3, the base 117 is provided in the underside thereof, with a pair of channels 149 for containing a pair of laterally extending arms 152 and 153. The arms 152 and 153 are retained in their respective channels by means of a retaining plate 154 secured to the base 117 by suitable fasteners, for example, screws not shown. Offset segments 157 and 158 of the arms 152 and 153 have disposed intermediate thereof a spring 159 serving to urge the arms laterally such that when the module 116 is received in the grooves 113 and 114, ends 161 and 162 of the arms, engage walls 163 and 164 of the grooves to thereby retain the module in various positions relative to the lamp housing 112. A pair of knobs 166 and 167 attached to corresponding ends of the arms 152 and 153 provide for manipulation of the arms against the bias of the spring 159 to thereby permit varying the position of the module within the grooves.

Figure 5:
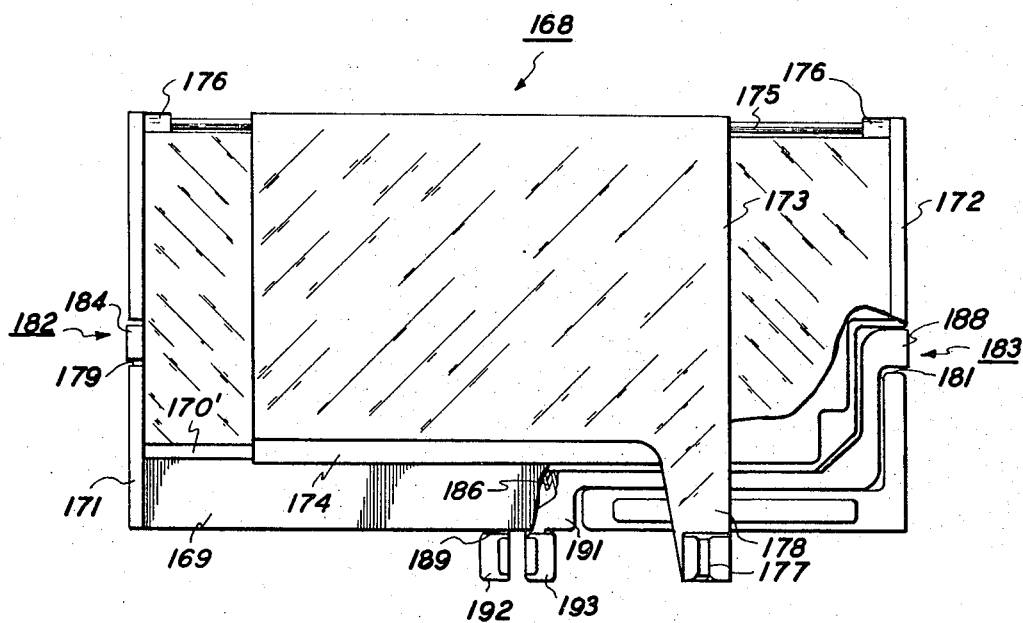
FIG. 5 is a top plan view of a microfiche module for use with the reader/printer shown in FIG. 1.
Figure 6:
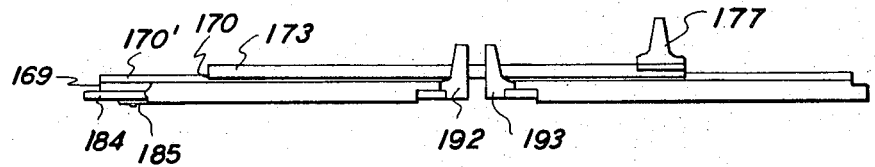
FIG. 6 is a front elevational view of the microfiche module shown in FIG. 5.

A modified form of the module 116, as illustrated in FIGS. 5 and 6 constitutes a microfiche module 168. The module 168 comprises a base member 169 having sidewardly extending flanges 171 and 172 insertable in grooves 113 and 114 of the front wall structure 108. A transparent top cover plate 173 and a bottom plate 174 pivotably connected to the base member 169 by means of a transversely extending shaft 175 captivated between rearwardly projecting lugs 176 cooperate to provide an area for placement of a microfiche to be projected.

A knob 177 attached to a forwardly extending arm 178 of the cover plate 173 is provided for manipulation of the cover plate for facilitating insertion of a microfiche between the cover plate and the bottom plate. The knob also serves to move the top plate and bottom plate transversely of the base member 169 in order to position a portion of information contained on the microfiche in the proper place for projecton thereof. To this end the top and bottom plates are slidable on the shaft 175 between the lugs 176. The bottom plate 174 is provided with a depending flange 170 extending the entire width thereof which cooperates with an upstanding abutment 170' of the base member 169 to prevent seizing of the plates during transverse movement. The base member 169 is provided with a pair of channels 179 and 181 for receiving laterally extending arms 182 and 183 which are captivated in the channels by retaining plate 184, the latter being attached to the base member by a plurality of screws 185. A spring 186 disposed intermediate offset segments 189 and 191 of the arms 182 and 183 urges the arms away from each other such that ends 187 and 188 thereof engage the bottom walls 163 and 164 of the grooves 113 and 114 to thereby maintain the module 168 at various positions along the longitudinal extent of the grooves 113 and 114. The opposite ends 189 and 191 of the arms are provided with knobs 192 and 193 to facilitate movement of the arms against the bias of the spring so that the module 168 can be positioned along the longitudinal extent of the grooves 113 and 114.

In order to facilitate installation of film or microfiche modules, the lamp housing 112, to be discussed hereinafter in conjunction with FIGS. 11 and 12 is pivotally supported by a pair of L-shaped shafts 194 and 195.

Figure 8:
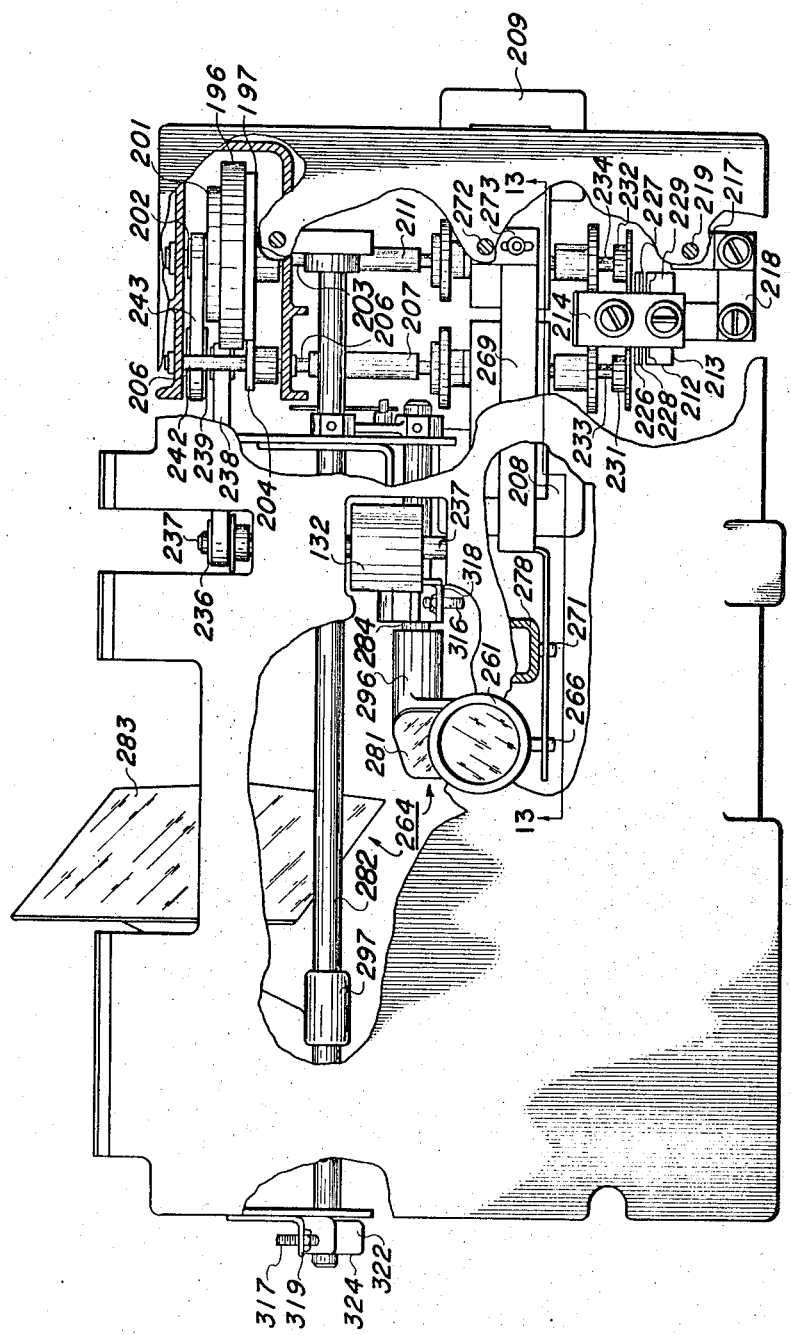
FIG. 8 is a plan view of a support, partly broken away, for the drive arrangement shown in FIG. 7.

The differential drive mechanism 133, as best shown in FIGS. 7, 8 and 9 comprises a planetary gear arrangement generally indicated 196 which includes a ring gear 197, a plurality of planetary gears 198 and a sun gear 199. The planet gears 198 are operatively supported by a carrier arm or member 201 which is provided with the output pulley 202 on the side opposite thereof from the planetary gears 198. The sun gear rotatably supported by a shaft 203 such that it is operatively engaging the planet gears 198 for effecting relative rotation between the arm 201 and the ring gear 197 in response to rotation of the shaft 203 (See FIG. 9). As can be seen, the ring gear constitutes a first input to the differential mechanism for effecting relative rotation between the ring gear and the carrier arm. A gear 204 carried by shaft 206 serves as a second input to the differential drive 133 for effecting the aforementioned relative rotation between the ring gear and carrier arm in a direction opposite to that effected by the ring gear. The shaft 206 is connected as by coupling member 207 to a first motor 208 while the shaft 203 is coupled to a second motor 209 by means of a coupling structure 211.

These motors are rotated in the same direction such that when the motors are operated at the same speed relative rotation between the ring gear 197 and the sun gear 199 is maximum and opposite so that planet 198 imparts no motion to arm 201, therefore, the output pulley 202 does not rotate. When the motors are operated at the same speed, by way of example in a clockwise direction as viewed from the front in FIG. 8, it will be seen that gear 204 also rotates in the clockwise direction which causes the ring gear 197 to rotate counterclockwise. The planet gears 198 will therefore rotate in a counterclockwise direction. Clockwise rotation of the sun gear 199 by means of the shaft 203 causes counterclockwise movement of the carrier 201 through rotation of the planet gears 198.

In order to produce an output i. e., a rotation in one direction of the arm 201 from the differential mechanism 196, through rotation of the gear 202, a motor braking structure generally indicated 212 is provided for the purpose of slightly impeding rotation of one or the other of the motors 208 and 209. This results in a slow but smooth drive speed at a relatively low torque level so that the differential speed of the motors can be obtained when the motors are operating at high speeds.

The motor braking structure 212, as best viewed in FIG. 7 comprises a bifurcated arm structure 213 mounted for pivotal movement to an L-shaped bracket member 214 supported by a depending rib 216 of the wall structure 108. A z-shaped arm 217 together with a substantially flat link arm 218 operatively connects the bifurcated bracket member to a motor control shaft 219 mounted for rotation in the wall structure 108. An actuator knob 220 (FIG. 1) is provided for effecting rotation of the shaft 219, either clockwise or counterclockwise depending on whether film is to be moved onto or from the take-up spool. A motor switching cam 222 (FIG. 7A) supported by the shaft 219 for simultaneous rotation therewith serves to actuate a pair of on-off switches 223 and 224 operatively connected to the motors 208 and 209, respectively and a line switch 225. The switches are positioned relative to the cams so as to simultaneously establish circuits through both motors or alternatively to establish a circuit through only one of the motors while opening the circuit to the other motor and vice versa. Thus, it will be appreciated that the motors can be separately run at full speed when it is desired to transport the film between reels at the maximum speed.

When viewing the film as projected onto the screen 111 to locate a specific portion thereof it is desirable to transport the film at a very low speed and at relatively low torque in order to accomplish scanning without jerking motions. In this instance, one or the other of a pair of friction pads 227 (only one shown) secured to the free ends 229 (only one shown) of the bifurcated arm structure 213 is brought into engagement through manipulation of the control knob 220 with one of a pair of depending brake arms 230 having friction material 231 carried thereby. The friction material, in turn, engages friction wheels 232 carried by input shafts 233 and 234 of the motors 208 and 209. It will be appreciated that when the engagement of the friction pad with its corresponding friction wheel is only slight, an output exhibited by either clockwise or counterclockwise rotation (as viewed in FIG. 10) occurs, which represents the difference between the speed of the motors 208, and 209.

The gear 132 (FIGS. 3a and 8) which operatively engages the shiftable gear or clutch member 131 is operatively connected to the output pulley 202 by means of a pulley 236 carried by a shaft 237 by which the gear 132 is also carried. A belt 238 provides suitable driving connection between the pulley 236 and idler on pulley 239 supported on a common shaft 241 with another idler pulley 242 which, in turn, is drivingly connected to the output pulley 202 through a belt 243. It should be apparent from the foregoing that when a differential speed between the motor exists, rotation of the shaft 237 occurs. Accordingly, either fast or slow movement of the film in either direction can be accomplished.

The lamp housing 112 as previously mentioned is pivotally supported by a pair of L-shaped shafts 194 for facilitating installation of a module 116 containing the reels 123 and 124 and film 244 associated therewith, actual pivoting being accomplished by means of a handle 245 forming an integral part of the lamp housing. The details of the lamp housing and the aforementioned pivoting arrangement will now be discussed in connection with FIGS. 11, 12 and 12A wherein the housing is illustrated as comprising an upper section 246 and a lower section 247 the former being removably supported on the latter by L-shaped rods 248 thereby facilitating replacement of a lamp 249. The lower housing section has a rearwardly extending arm 251 provided with a pair of shaft receiving members 252 for attaching the lower section 247 to the front wall structure 108. The opposite ends of the rods 194 are journalled as indicated at 253 (FIG. 12).

The rearwardly extending arm 251 has spaced apart downwardly depending portions 254 which support a shaft 256 which engages a bias spring 257. The spring 257 serves as a two position stop member for maintaining the lamp housing in each of its positions (i.e., contiguous the front wall structure 108 or remote therefrom). The spring is attached to the underside of the front wall structure by a pair of self taping screws 258.

Figure 14:
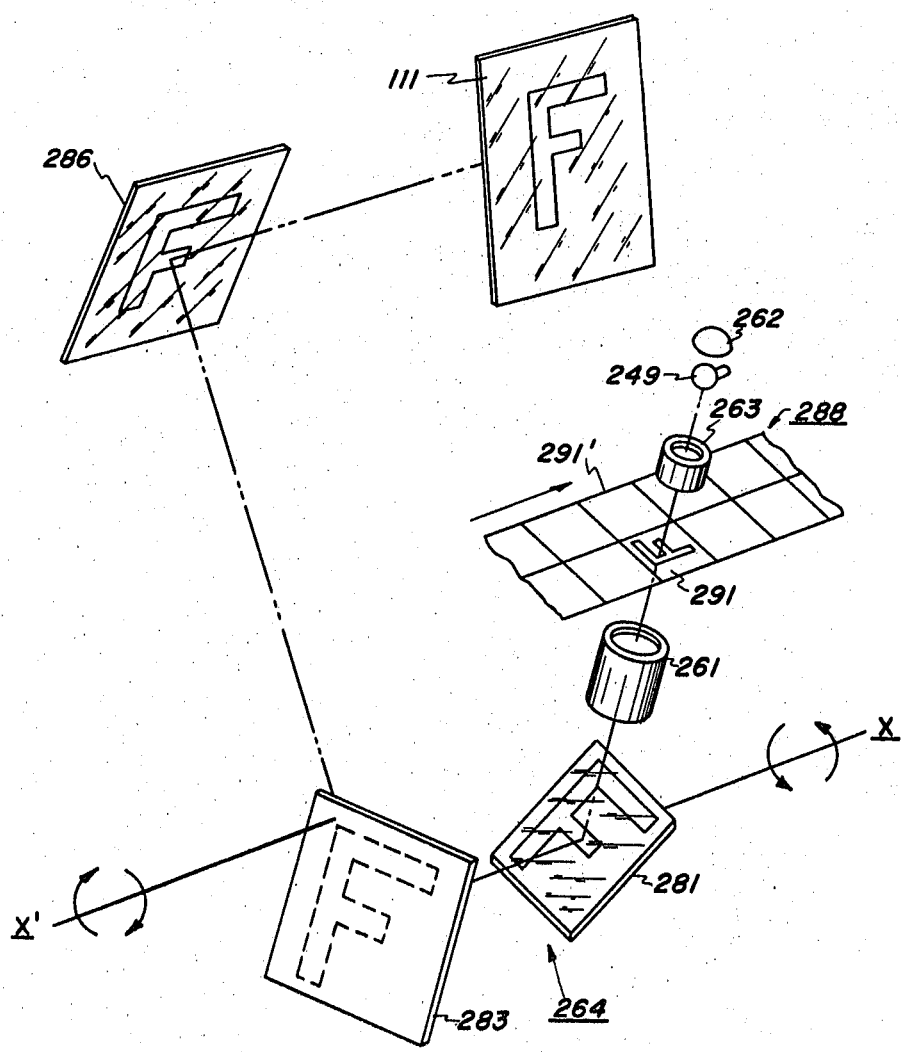
FIG. 14 is a schematic illustration in perspective of an image rotation system in one mode of operation.

A pair of rollers 259 suitably supported in a conventional manner in the lower housing section 247 (FIGS. 11 and 12A) serve to properly position the film 244 intermediate the lamp housing and an objective lens assembly 261 (see FIG. 14). As the film passes between the lamp housing and the lens assembly it is illuminated by the lamp 249, radiation being directed downwardly by means of a reflector 262 supported within the upper housing section 246. A condensing lens assembly 263 collects and focuses the illumination from the lamp onto a selected area of the film 244. The lens assembly 261 projects the illuminated image generally downwardly along an optical projection path including a mirror arrangement 264 for optically rotating the projected image.

The objective lens assembly 261 is adapted to be moved toward and away from the film 244 in order to provide for focusing of various films. To this end the assembly 261 is provided with a pin member 266 extending radially from the circumference thereof (FIGS. 8 and 13). The pin member acts as a cam follower cooperatively engaging inclined cam surface 267 delineating an aperture 268 provided in a camming member 269. The camming member 269 is operatively supported for lateral movement adjacent one end by a pin member 271 and indirectly adjacent the other end by a focusing shaft 272, the focusing shaft being attached through a substantially Z-shaped link 273. Rotation of the shaft by a knob 276 causes rotation of the free end of the link 273 through a small arc, the free end, in turn, imparts lateral movement of the camming member, as viewed in FIGS. 8 and 13, through its engagement with opposite ends of a second aperture in the camming member.

The support pin member 271 which is secured to flange structure 278, depending from the underside of the front wall structure 108, rides in an elongated horizontally disposed slot 279. It will be apparent that when the focusing shaft 272, which is supported by the front wall structure 108, is rotated so as to effect movement to the left, of the camming member 269, as viewed in FIGS. 9 and 11, the lens assembly moves in the upward direction.

The image rotating arrangement 264 (FIG. 8) comprises a mirror 281 rotatably supported immediately sub-adjacent the lens assembly 261 by means of a shaft structure 284. A second mirror 283 rotatably carried by a shaft structure 282 cooperates with the mirror 281 to reflect an image to the viewing screen in the aforementioned optical path, which also includes a tiltable mirror 286. Setting of the mirrors for a desired mode of operation is accomplished by means of a film format control knob 287 (see FIG. 1) in a manner to be discussed hereinafter.

The function of the optical rotating arrangement 264 will now be discussed in conjunction with the schematic representation thereof as depicted in FIGS. 14–16.

In FIGS. 14 and 15 there is illustrated a film strip 288 which may be designated as type A format film. In FIG. 16 there is illustrated a film strip 289 which may be designated as type "B" format film. These film formats are more fully described in American Librarian's Association Microfilm Norms (1966) (Library of Congress Card Catalogue No. 66-27372). Briefly, in film strip 288, which is designated as type A format, film frames 291 and 291' are arranged transversely in pairs, which pairs extend in column fashion along the longitudinal length of film strip 288. According to type A format the images on the individual film frames 291, 291' are oriented along the longitudinal direction of film strip 288 as may be seen in FIGS. 14 and 15. That is, individual letters and characters such as the F illustrated are arranged in the longitudinal direction whereas lines of printed material extend in the transverse or lateral direction across film strip 288. In film strip 289, which is designated as type B format film, individual film frames 292, 292' are arranged across the width of film strip 289 and extend in single column fashion along the length of film strip 289. According to type B format the images on the individual film frames 292, 292' are oriented along the transverse or lateral direction of film strip 289 as may be seen in FIG. 16. That is, individual letters and characters such as the F illustrated are arranged in the transverse or lateral direction whereas lines of printed material extend in the longitudinal direction along film strip 289.

Referring first to FIG. 14 of the drawings, the projection arrangement as contemplated by the present invention will first be described in connection with the use of the film strip 288 which is of the type A format. Film strip 288 may be advanced in the direction of the arrow as shown in FIG. 14 until the desired film frame 291 is positioned at the projection station in the optical projection path. It will be noted that the illustrated image F on film frame 291 is oriented in the longitudinal direction with respect to the length of film strip 288. The projection lamp 249 when energized emits radiation which is directed generally downwardly by means of the reflector 262. The condensing lens assembly 263 collects the focuses illumination from the projection lamp 249 onto the selected film frame 291. The objective lens assembly 261 is located beneath film frame 291 at the projection station which projects the illuminated image of film frame 291 downwardly as may be seen from FIG. 14 in the optical projection path which is substantially normal to the plane of film frame 291.

The reflecting mirror 281 having a highly specular surface thereon is operatively disposed along the optical projection path beneath objective lens assembly 261 to intercept and reflect the projected image of film frame 291 in a direction which is substantially parallel to the longitudinal length of film strip 288 and substantially normal to the optical projection path from projection lens 261. The reflecting mirror 283 having a highly specular surface thereon is operatively disposed to intercept and reflect the projected image reflected from reflecting mirror 281 in a direction generally transverse to the longitudinal direction of film strip 288 in the direction of the mirror 286.

The tiltable mirror 286 having a highly specular surface thereon is positioned rearwardly within housing 102 along the optical path emanating from reflecting member 283 to intercept and reflect the projected image emanating from reflective member 283 onto viewing screen 111. The projected image emanating from reflecting member 286 onto viewing screen 111 produces a pattern of light and dark areas on the rear face of viewing screen 111 at a predetermined magnification ratio. Viewing screen 111 being constructed of a material which is of a generally translucent nature diffuses the patterns of light projected thereon to form a viewable image on the face of viewing screen 111 opposite from the face on which the image is projected. Thus, from the arrangement illustrated in FIG. 14 an image, for example F, is produced on viewing screen 111 which is oriented in the vertical direction relative to the eye of an observer, from an image on film frame 291 which is oriented in a horizontal or transverse direction relative to the eye of the observer.

The reflecting member 281 is operatively supported beneath the objective lens assembly to be rotated from the position as shown in FIG. 14 in the direction of the arrows about an axis X of the optical projection path which extends between reflecting member 281 and reflecting member 283. In a similar manner, reflecting member 283 is operatively supported to be rotated from the position as shown in FIG. 14 in the direction of the arrows about an axis X' which is offset from and substantially parallel to the axis X. By selectively positioning film format control knob 287 (FIG. 1) the positioning of reflecting members 281 and 283 may be changed from that illustrated in FIG. 14 to the position as illustrated in FIG. 15.

In the position as illustrated in FIG. 14, reflecting member 281 is disposed in a plane which is substantially normal to a vertical plane extending in the longitudinal direction of film strip 288 and is inclined at angles of substantially 45° to a vertical plane extending in the transverse direction of film strip 288 and a horizontal plane parallel with the plane of film strip 288. In the position as illustrated in FIG. 14 reflecting member 283 is disposed in a plane which is substantially normal to a horizontal plane parallel with the plane of film strip 288 and is inclined at angles of substantially 45° from a vertical plane extending in the longitudinal direction of film strip 288 and a vertical plane extending in the transverse direction of film strip 288.

In the position as illustrated in FIG. 15, reflecting member 281 has been rotated from the position of FIG. 14 about the axis X in the counterclockwise direction as viewed from the left in FIG. 14 through an angle of substantially 45°. In the position as illustrated in FIG. 15, reflecting member 283 has also been rotated about the axis X' from the position of FIG. 14 an angle of substantially 45° but in the clockwise direction as viewed from the left of FIG. 14.

In the position as illustrated in FIG. 15 because of the change in positioning of reflecting member 281 from that as shown in FIG. 14 to that of FIG. 15, the orientation of the image reflected from reflecting member 281 has been similarly rotated relative to that as shown in FIG. 14. In a similar manner, because of the change in positioning of reflective member 283 from the position as illustrated in FIG. 14 to that as illustrated in FIG. 15, the orientation of the image reflected from reflecting member 283 onto reflecting member 286 has been rotated relative to the image orientation as shown in FIG. 14. Thus, by rotating reflecting member 281 through an angle of substantially 45° in a first direction and by rotating reflecting member 14 through an angle of substantially 45° in a second direction opposite to that in which reflecting member 281 is rotated about the optical axis X a rotation of the projected image substantially equal to 90°, or a right angle is obtained as a result of the combined relative displacements between the respective reflecting members 281 and 283. Thus from FIG. 15 it will be observed that the projected image emanating from reflecting member 283 is then reflected from reflecting member 286 onto viewing screen 111 in a manner similar to that described in connection with FIG. 14. However, it will be noted that as a result of the respective positioning of the reflecting members 281 and 283 as shown in FIG. 15 an image, for example F is produced on viewing screen 111 which is horizontally oriented to the eye of the observer from an image on film frame 288 which is similarly horizontally oriented to the eye of the observer. It will be further observed that the image projected onto viewing screen 111 in FIG. 15 is rotated substantially 90° relative to that as shown on the viewing screen of FIG. 14. Thus it will be further understood that by selectively positioning the reflective members 281 and 283 from the respective positions shown in FIG. 14 to those respectively illustrated in FIG. 15 a rotation of the viewable image on viewing screen 111 is produced which is substantially 90° or substantially at a right angle relative to the viewable image on viewing screen 111 produced from the positioning of reflective members 281 and 283 as illustrated in FIG. 14.

Accordingly, where type B format film having images thereon which are vertically oriented relative to the eye of the observer such as that illustrated in FIG. 16, reflecting members 281 and 283 may be selectively rotated to the respective positions as shown in FIGS. 15 and 16 by means of film format control 287. In this position the image of film frame 292 is projected onto reflecting member 281 by means of objective lens assembly 261 and is reflected onto reflecting member 283 in the manner as described in connection with FIG. 15. The projected image, for example F is reflected from reflecting member 283 onto reflecting member 286 and then onto viewing screen 111 in a vertical orientation relative to the eye of the observer. Thus, from this arrangement a viewable image F having a vertical orientation relative to the eye of the observer is produced on viewing screen 111 from a film frame 292 having an image orientation which is similarly vertically oriented relative to the eye of the observer.

From the foregoing arrangement, it will therefore be appreciated and understood that a film strip, either 288 or 289 may be positioned on the film viewing apparatus in the same general attitude relative to the eye of the observer irrespective of the particular image orientation format on the individual film frames. Thus where the image orientation on the individual film frames is of type A format an image orientation on the viewing screen 111 may be selectively produced which has a vertical orientation relative to the eye of the observer with lines of printed information extending horizontally across the screen. In a similar manner, where the image orientation on the individual film frames is of a type B format an image on viewing screen 111 may be selectively produced which has a similar vertical orientation relative to the eye of the observer with lines of printed information extending horizontally across the screen. Thus a predetermined orientation of the viewable image on viewing screen 111 may be selectively produced irrespective of the particular film format. This arrangement therefore produces an optical rotation of the projected images on viewing screen 111 between the various film formats without requiring a corresponding physical rotation of the relative positioning of the particular film strips according to the various film formats.

The mirrors 281 and 283 are operatively connected to the shafts 284 and 282 by a pair of mirror support structures 296 and 297 (See FIGS. 8 and 10) which are fixedly attached to the shafts for movement therewith. Synchronized movement of the shafts 284 and 282 is accomplished by means of a linkage arrangement generally indicated by reference character 298 (See FIG. 10).

The linkage arrangement 298 comprises a bifurcated arm 299 attached to the shaft 282 and a pin carrying arm 301 having a pin member 302 integral therewith and disposed intermediate segments 303 and 304 of the bifurcated arm 299. As can be seen from FIG. 10, rotation of the shaft 282 in a clockwise direction will effect rotation of the arm 299 in the same direction which, in turn, causes counterclockwise rotation of the shaft 284 through engagement of the pin member 302 by the segment 304. An over-center spring 306 operatively attached to the arms 299 and 301 by pin members 307 and 308, cooperates, in a well-known manner, with a format control shaft 309 (See FIGS. 7 and 10) to effect movement of the shafts through the required angles for positioning of the mirrors 281 and 283.

The format control 309 comprises the knob 287 carried by a shaft 312 having a helical gear 313 affixed thereto which cooperatively engages a helical gear 314 carried by the shaft 282.

Pairs of adjustable shaft stops 316 and 317 (see particularly FIGS. 8 and 10) supported by suitable brackets 318 and 319 are provided in order that the movement of the shafts 282 and 284 may be calibrated or set in accordance with machine and individual parts tolerances. A pair of identical stop-arm structures 321 and 322 attached to the shafts 284 and 282 are each provided with a pair of arms 323 (See FIG. 10) and 324 which cooperate with the pairs of adjustable stops 316 aand 317.

A mirror arrangement 264 for optically rotating the image for projection (along a path indicated by solid lines) to the screen 111 in a predetermined orientation is also used in conjunction with the tiltable mirror 286 to project an image of either A or B type format to a photosensitive (along a path indicated by dotted lines) surface herein disclosed as a single-use photoreceptor 351 (See FIG. 2). The photoreceptor may be made from any suitable material, for example, pthalocyanine coated paper provided in the form of an elongated web wound on a supply reed 352. A reel 353 is provided for use as a take-up means for used photoreceptor material. Intermediate the reels 352 and 353, along the path of travel therebetween, are a charging device generally indicated by reference character 354 and a developer structure 356.

The charging device 354 comprises an upper corotron 357 and a lower corotron 358 between which the photoreceptor 351 passes. The upper corotron is energized by means of a power supply 359 (FIGS. 19 and 26) so as to place a positive charge on the top of the photoreceptor 351 while the lower corotron is energized so as to place a negative charge at the bottom thereof. It will be apparent that the foregoing arrangement provides a suitable charging device without the necessity of a backing electrode.

Although other charging devices known to those skilled in the art may be utilized, it is preferable to charge the photosensitive web by corona discharge from a wire filament or wire filament array which is maintained at high potential as described, for example, in U.S. Pat. Nos. 2,588,699 to Carlson, 2,836,726 to Vyverberg, 2,777,957 to Walkup, 2,778,946 to Mayo, and others.

The power supply for the corona charging unit may be of any construction well known in the art which provides apapproximately 7,000 volts D. C. from a commercial outlet of 110 volts, 60 cycle alternating current.

The developer structure 356, as illustrated in FIGS. 2, 17, 17a, 17b and 19 comprises a substantially closed housing 361 supported for pivotal movement between left and right side support structures 362 and 363, respectively, by means of a developer feed roller shaft 364 (FIG. 19).

The developer housing structure 361 which may be made from a number of suitable materials, for example, aluminum, comprises a top cover 366 securely fastened to end member 367. A developer applicator roll 369 is rotatably supported within the housing by the end members and constitutes a gravure roller which is capable of physically contacting the photoreceptor 351 in order to transfer developer thereto. A feed roller 371 carried by the shaft 364 which is adapted to be rotated about its longitudinal axis serves to transfer developer from a reservoir 372 to the developer roll 369. An edge and corner doctor blade 373 is supported by an arm 374 of the housing structure 361 by any suitable means, for example, a screw 276. A main doctor blade 377 is fastened to a support member 378 by means of a clamp 379 held in place by a plurality of screws 381 (only one of which is shown). The main doctor blade support 378 is rigidly fastened to a pivot shaft 382 by a plurality of screws 383, only one being shown. The pivot shaft 382 which is cylindrically shaped at its ends to pivot within the end members 367 and 368 is biased in position by a flat spring 384 which may provide adjustable tensioning by means of a set screw 386. Developer material is fed to the reservoir 372 by means of a conduit 387 attached to a developer supply, not shown, held in place by a support structure 388 (FIG. 18), which feeds developer to the reservoir by gravity. The developer roll 369 is adapted to be held in transfer engagement with the photoconductor 351 supported in place by a support to back-up roller 389, through pivoting of the housing structure 361 about the feed roller shaft by means of a pair of springs 391 (only one being shown) disposed on opposite sides of the developer structure 356 which in tensioning engagement with a sidewardly extending rod 392 carried by a rearwardly extending arm of the developer housing. A sidewardly extending rod 394 carried by an upwardly extending arm 396 serves as a cam follower which cooperatively engages a cam 397 rotatably supported above the rod 394 by means of a shaft 398 supported intermediate a bracket 399 and the left side support structure 362. The shaft 398 is adapted to be rotated by a sprocket 401 operatively coupled to the cam 397 by means of a one-way clutch member (not shown) which prevents rotation of the cam in one direction while allowing rotation of the cam with the shaft 398 in the opposite direction for a purpose to be discussed hereinafter.

The photoreceptor web 351, as mentioned hereinabove, is first charged by the charging device 354, before engagement with the developer roller 369. While the photoreceptor is being charged the developer roll 369, which is disengaged from the photoreceptor 351, is primed through its rotation of a sprocket 403 mounted on the shaft 364 by means of a one-way clutch and bearing arrangement 404. In the direction of positive drive between the sprocket 403 and the shaft 364 the feed roll 369 is rotated thereby carrying the developer from the reservoir to the applicator surface of the developer roll, the feed roll being drivingly connected to the developer roll by a mating gear arrangement, not shown.

The cam 397 (FIG. 18) comprises a high profile side 406 and a low profile side 407, the former of which acts, during a predetermined part of the machine cycle, to effect disengagement of developer roll 369 from the photoreceptor 351 while the latter serves to permit engagement of the developer roll with the photoreceptor through biasing of the spring 391. The side 406 is provided with a notch 408 representing the home or start-of-cycle position, from which the cam 397 is rotated in a predetermined manner to be discussed hereinafter.

The gravure roller 369 constitutes a developer dispensing element comprising a generally cylindrical base support having disposed on its surface a raised pattern (not shown) which may, for example, comprise a plurality of fine raised dots, lines, helical ridges or other similar elements. The foregoing structure is characterized by being wettable by the ink or developer employed in the depressions or valleys formed by the raised areas.

Prints of good quality and relative ease of operation can be obtained with a preferred gravure roll having a trihelicoid pattern of between 80 and 300 lines per inch, with about 180 to 250 lines per inch being preferred, cut at an angle from about 30° to about 60°, preferably about 45°, to the longitudinal axis and to a depth of from about 1½ mils to 6 mils. Typical material from which the gravure or applicator roller may be made include steel, brass, or aluminum. The roll may typically comprise a shaft of one material with a shell or sleeve of a second material. Ink is supplied to the valleys or depressions through rolling contact of the gravure roller with the feed roller 371. Like all materials employed, the feed surface should be relatively resistant to aging and wearing and chemical attack by the developer. Considerable latitude is permitted in the selection of the feed surface when it is employed only as the feed surface. That is, when it is employed merely to supply or load the applicator surface with unmetered quantities of developer in undoctored configuration, any developer feed system may be employed.

When, however, the feed surface is to serve both as a feeding and as a doctoring surface, the surface should preferably be smooth to avoid any disfiguring of the applicator surface with which it comes in moving contact during the doctoring operation. Also, the material employed for the combination feed and doctoring surface should be relatively resilient having a shore hardness (A scale) durometer of from about 40 to about 90. Optimum print quality may be obtained with a durometer from about 50 to about 60. Any suitable material may be selected for the feed surface. Typical examples of materials which may be employed for this surface include steel, silicone rubber, fluorosilicone rubber, synthetic rubbers, urethanes and polyurethanes.

Doctoring of the developer loaded applicator surface may also be accomplished by means of doctor blades. A principal doctor blade extending the entire length of the applicator surface may be used alone or in conjunction with edge and corner doctor blades. The doctor blades may be made of any suitable material which is relatively resistant to aging, searing and chemical attack by the developer liquid. Typical materials include steel, silicone rubbers, fluorosilicone rubbers, urethanes, polyurethanes, Mylar, (polyester). The main doctor blade should contact the applicator surface along a line or narrow path to provide the desired metering of developer material to the applicator surface in doctored configuration. The edge and corner doctor blade should contact the edge of the applicator surface in the corner to move excess developer and prevent the accumulation of developer along the corner of the applicator surface.

Any suitable developer material may be employed, for example, polar or non-polar liquids. It is desirable that the developers be compatible with the particular materials they come in contact with during the operation of the developer system. The developer may have pigments dispersed or dyes dissolved therein or both. Typical liquid developers useful may be selected from the commercially available water, oil and alcohol based inks and include among others as vehicles: mineral oil, olicacid, polypropylene glycol, mineral spirits, glycerol and sorbitol.

To minimize spillage and contamination of the mechanical movements of the developer material, the housing structure for the gravure roller should be essentially fully enclosed to outside influence except for the supply of developer material to the developer bath in the housing structure and for the opening necessary for the applicator surface to be placed in developing engagement with the photosensitive paper. The housing structure for the developer material and components may be of one piece construction such as an extruded tray. To insure longevity of operation the materials employed in the developer housing structure are preferably not subject to attack by the particular developer employed.

To accomplish development through electrostatic attraction of the developer material on the gravure roller to the image bearing surface in image configuration, with minimal background development the support base of the gravure roller is biased (including ground) through connection to the power supply 359. When so connected, the image charges on the surface to be developed, induce, due to conductivity through the support base and into the conductive ink, charges which tend to neutralize charges on the surface of image bearing surface. Thus, when the support base is grounded and areas of the plate carry positive charges, negative charge is induced through the support base into the liquid developer in those areas positioned adjacent to the positive charges, thus causing a field between the developer and the charge on the surface to be developed in such regions. In areas of ink corresponding to areas of the image bearing surface without charge, no attractive field exists to cause charge to migrate into the conductive ink through the support base while the support base is grounded, and accordingly, no electric field of attraction is created to cause ink to creep up the raised areas of the gravure roller and to the surface bearing the charge pattern. Thus, development takes place only in charged areas when the support base is connected to ground or connected to a low potential generally about the level of the uncharged or substantially uncharged areas of the image bearing surface. It is noted that development in accordance with the foregoing is not polarity sensitive. Thus, development does take place in the sense that charged areas develop and uncharged areas do not develop if the charge areas are negative in polarity just as development takes place when the charges are positive in polarity. In such a case, positive charges would be induced into the areas corresponding to the negative charges on the electrostatic image bearing surface. A field would then exist to cause ink to creep up the raised area for deposition on the image bearing surface.

While the foregoing was described in conjunction with development of the charged areas, the uncharged areas may be developed by applying to the support base a potential of the same polarity and of the same amount as the charged areas of the electrostatic image bearing surface as through a change in the potential applied by means of the power supply 359. In such an instance a field would exist between areas uncharged on the electrostatic image bearing surface and the developer on the gravure roller, and no field would exist in areas of charge and corresponding ink on the gravure roller. Thus, in areas of charge there would be no attraction for ink and none would deposit upon the electrostatic latent image bearing surface. However, in areas of no charge, charges would be induced to the ink resulting in electric fields of force which would cause ink to deposit on the electrostatic image bearing surface resulting in image development of uncharged areas. As an area discharges due to light exposure, electric fields of force come into being between the light sensitive member and the ink on the gravure roller. There follows induction of charge into ink in this area and the creation of electric fields of force between the ink and the surface in the area being discharged of the plate. When these forces are sufficient to overcome surface tension in the developing ink, the ink deposits on the light sensitive member, resulting in a developed image.

It should be apparent that both positive charges and negative charges can be employed to accomplish deposition of developer in areas being exposed, the support base of the gravure roller would have applied thereto in conjunction with negative charges, a negative potential about equal to the level of charge applied to the surface of the light sensitive member during sensitization. Also, one can accomplish development in areas not exposed by applying to the support base of the gravure roller a varying potential controlled by the light decay characteristics of the photoconductor insulating layer being exposed. By so doing the potential applied to the gravure roller maintains a no field condition between this member and the surface being exposed in areas being exposed during exposure; whereas in areas not exposed, a field develops as exposure continues and ink deposition takes place on the non-exposed areas.

In practice it has been found that it is generally desirable to apply a slight bias to overcome the reluctance of the developer material to transfer to the plate and to insure high quality and background-free developer deposition on the charge pattern bearing surface. Thus, when applying a raised potential to the gravure roller, it is desirable to add about another 50 volts so that if areas of the plate are at a level of 450 volts the gravure roller will have applied approximately 500 volts to result in ink deposition in areas which have been discharged on the surface being developed. This additional potential applied to the gravure roller creates a stronger field for liquid movement and deposition. Similarly, when developing charge areas and background areas are at about a raised potential of 5 volts positive, it is desirable to apply a potential of about approximately 30 to 50 volts negative to the gravure roller.

When dry powdered material such as electroscopic marking particles or "toner" is used, it can be presented to the photosensitive web by either a fur or magnetic brush, or by a cascade arrangement, the toner being attracted to the charged areas of the web. The "toner" or developed image would be subsequently transferred by a copy sheet and then fused or rendered permanent by the application of heat and pressure which could be provided by means of transfer rolls suitable for such application.

Once the latent image has been developed and is in a transferable state a single sheet of paper is fed toward the developer housing 361 by means of a paper feed shaft 409 having thereon a pair of resilient grippers (not shown) which physically engage the sheet of paper. The paper feed shaft 409 is suitably journalled in the left and right side support plates 362 and 363 by suitable bearings 412. A drive sprocket 413 supported on the outside of the right support plate 363, driven by a suitable chain 414 is freely supported on the feed shaft 409 such that during portions of the machine cycle it has no effect on the rotation of the shaft.

Figure 20:
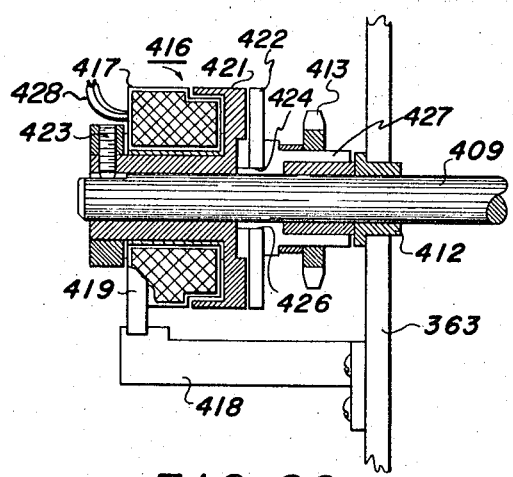
FIG. 20 is a view taken along the line XX—XX of FIG. 19.

An electromagnetic clutch mechanism generally indicated at 416 (see FIG. 20) comprises an electromagnet 417 which is supported adjacent the end of the shaft 409, the shaft being free to rotate relative to the magnet while the magnet is prevented from rotating by a sidewardly extending abutment member 418 received in a notch 419 provided in the magnet housing. A pair of clutch plates 421 and 422, the former being substantially T-shaped in cross section and the latter being substantially rectangular, are provided for coupling the sprocket 413 to the shaft 409. The T-shaped clutch plate is fastened to the shaft 409 by a set screw 423 such that the shaft and the clutch plate must be turned as a unit. The rectangularly shaped clutch plate 422 having a square aperture 424 therethrough is carried by a square-shaped flange 426 of a bearing structure 427. It will be seen that the clutch plate 422 is free to move along the longitudinal axis of the shaft such that when the electromagnet is energized through electrical leads 428, it is attracted to the clutch plate 421 and magnetically coupled for rotation therewith.

As viewed in FIG. 2, a transfer roller 429 is supported by the structures 362 and 363 subadjacent the web support roller 389. The purpose of the transfer roller is to apply pressure to recording paper and the photoreceptor for causing image transfer by contact only of the latter with the former, consequently, the transfer shaft is mounted both for rotation about the transverse axis extending between the side support structures and for slight movement in the vertical direction. A pair of springs 431, only one being shown (FIG. 17) one adjacent each end of the transfer roller, are provided for biasing the roller upwardly during transfer. Each spring 431 is supported by pin member 432 carried by the side support structures and has a first arm captivated in a notch 433 in the structures 362 and 363 and a second arm in engagement with the underside of the transfer roller. A pair of cam follower arms 434 supported for pivotal movement adjacent opposite end of the transfer roller cooperate with a pair of cams 436 to hold the transfer roller out of engagement with the photoreceptor during prescribed portions of the machine cycle, therefore, when image transfer is not taking place. The cams 436 mounted on a cam shaft 437 are rotated into and out of engagement with the cam followers by means of a sprocket 438 secured to the cam shaft 437 adjacent the side support 362.

A stack of plain sheet paper indicated at 440 (FIG. 2) is supported subadjacent the feed shaft 409 by a paper tray structure 442. The paper tray structure (FIGS. 21 and 22) comprises a base 444 having sidewardly projecting pin members 446 adjacent the forward end thereof and an upstanding projection 448 adjacent the rear end. The tray structure is supported in the machine 101 by a pair of guide rail structures 450 attached, one each, to the support structures 362 and 363 and a pair of supports only one being shown 454, the supports 454 being attached to the support structures 362 and 363 adjacent the rear end of the guide rails.

The guide rail structures 450 are identical, but opposite hand, in construction, each having a horizontally disposed groove or channel 456 adjacent the bottom thereof. The lower wall defining the channel 456 is continuous while the top wall is segmented. A segment 458 comprising part of the top wall delineating the channel 456 stops short of a rear wall 460 to provide an opening 462. The opposite end of the segment 458 comprises a flexible element 464 which occupies a generally horizontal position but because of its flexibility can be moved downwardly in a manner and for a purpose to be described.

The forward end of the tray structure 442 is biased upwardly by a spring structure 466 in order to effect pivoting of the tray structure about its opposite end. The upstanding projection 448 together with a sidewardly projecting pin element 468 of the guide rail structure and the support structure 454 form a fringe arrangement about which the tray structure pivots.

The grooves 456 cooperate with the pin members 446 in such a manner that the tray structure 442 acts as a cam to move the spring 466 to a stored energy position from which it is effective to bias the forward end of the tray structure in an upwardly projection. It will be noted the position of the grooves (i.e., at the bottoms of the guide rails) keep the tray at a low enough level during installation thereof so that the stack of paper clears the feed shaft 409. Once the tray structure has been completely installed the pin members 446 are in position to be moved through the openings 462 under the influence of the spring 466.

A resilient finger or catch member 470 received in an aperture 472 in the base member 444 serves to lock the tray structure into its operating position. A pair of stops 474 supported in the structures 362 and 363 cooperate with the pin members 446 during loading of the tray structures to prevent inadvertent withdrawal thereof by the operator. The stops are supported for vertical movement such as to permit removal of the tray structure by a service man.

A pair of drag pads 476 each carried by a flexible arm 478 engage the longitudinal edges of the paper supported by the tray structure thereby cooperating with the feed shaft to move a single sheet of paper from the tray. The arms 478 are secured to vertically oriented ribs 480 which are integral with the base member 444. Upon rearward movement of the tray structures a cam follower 482 forming an integral part of the arm 478 engages the surface of a cam 484 integral with the support 454 thereby effecting sideward movement of the pads 476 to permit placement of paper on the base number 444. The support 454 similarly cooperates with the other arm 478 to effect the same result. A pair of rib members 486 adjacent the back end of the tray structure cooperate with the ribs 480 to maintain the stack of paper in its proper position.

During rearward movement of the tray structure, access to which, is had through an opening (not shown) in the base housing section 105, each of the pin members 446 engages a flange 488 which cooperates with the segment 458 and the wall 460 to delineate a triangular-shaped opening 490. The flange 488 slopes downwardly from left to right as viewed in FIG. 21 and terminates just below the flexible element 464, consequently, the pin members 446 are directed back into the channels 456.

Figure 24:
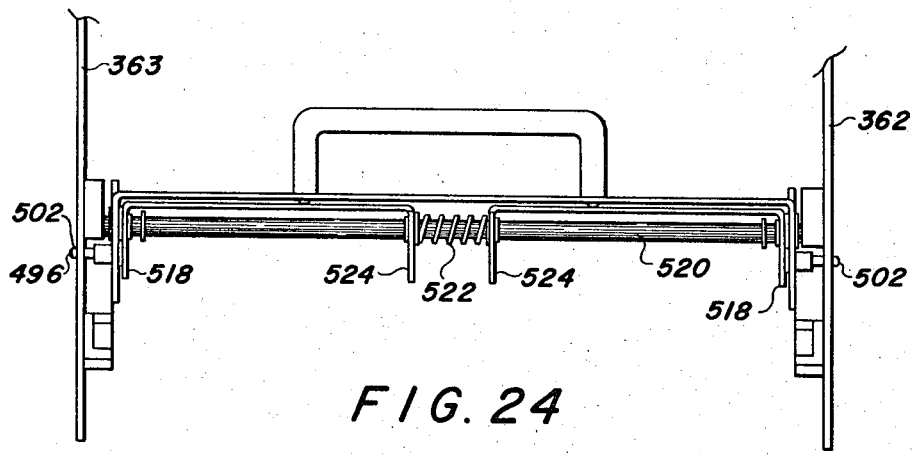
FIG. 24 is a rear elevational view of the support structure shown in FIG. 23.
Figure 23:
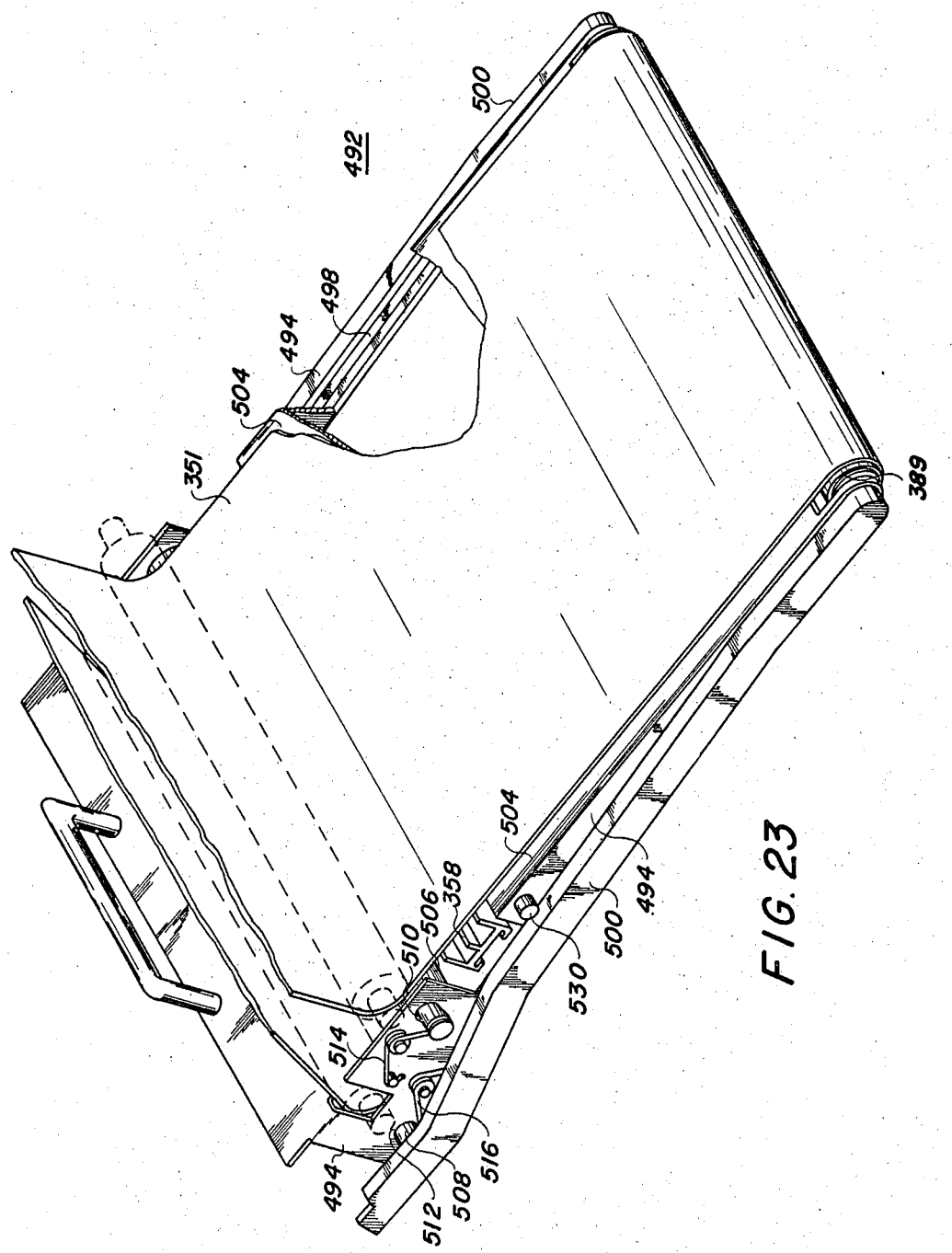
FIG. 23 is a perspective view of a photoreceptor support structure.

The support or backup roller 389 forms part of a photoreceptor loading and support drawer structure generally indicated 492 (see FIGS. 2, 23 and 24), the roller being supported intermediate side support frames 494 of the drawer structure. The ends of the roller 389 cooperate with a pair of sidewardly extending pins 496 to support the drawer structure within the apparatus. To this end, the shaft ends are received in grooves 498 provided in track members 500 attached to the support structures 362 and 363 while the pin members are received in apertures 502 in the support structures, as will be discussed hereinafter.

The combination drawer and support structure 492 comprises a top support panel 504 where the photoreceptor 351 rests during exposure and a pair of rollers 506 and 508, the former of which is rotatably supported in a pair of vertically elongated slots 510 and the latter of which is rotatably supported in a pair of vertically elongated slots 512, one each in the frame members 494. A pair of springs 514 normally urge the roller 506 upwardly while a pair of springs 516 provide the same function relative to the roller 508. The drawer structure 492 also supports the lower corotron 358, and the power terminal 471 where shown the latter of which is automatically unplugged when removing the drawer structure, in a manner which will become apparent hereinafter.

The sidewardly extending pins 496 are carried, one each by a pair of bracket structures 518 slidably mounted on a transverse rod 502 supported by the frame members 494. A coil spring 522 carried by the transverse rod, intermediate the bracket structures 518 urges the pins 496 into the pin receiving apertures 502 in the support structures 362 and 363. It will be apparent that the pins 496 can be retracted through manipulation of the depending flanges 524 of the brackets from their corresponding apertures 502 to permit removal of the drawer structure. Contrariwise, when the pins are received in their respective apertures, the drawer structure is locked in its operable position.

As can be seen, the grooves 498 are contoured such that upon insertion of the drawer structure 492, the forward end thereof moves substantially horizontally, then upwardly over inclined portions 526 and then substantially horizontally across rear segments 528 of the grooves 498. A pair of guide pins 530 which ride on top of the track members 500 cooperate with the ends of the support roller 389 to guide the drawer structure into place. Once fully inserted the drawer is pivotable about the ends of the roller 389 such that the rear end of the drawer can be raised for permitting insertion of the retractable pins 496 into the apertures 502. It will be apparent that the power terminal 471 is connected through such upward movement of the drawer structure.

As the name implies, the loading and support drawer structure 492 serves to load a new photoreceptor 351. the spool of the new roll of photoreceptor together with a pair of yokes 534 and 536 journalled in the support structures 362 and 363 constitute the supply reel 352. While the spool from an exhausted roll of photoreceptor together with a pair of cooperating yokes 538 and 540 also journalled in the support structures 362 and 363 form the take-up reel 353 in order to captivate the photoconductor spools therebetween. To facilitate insertion and removal of the spools, the yokes 536 and 540 are provided with sets of resilient fingers not shown.

Figure 25:
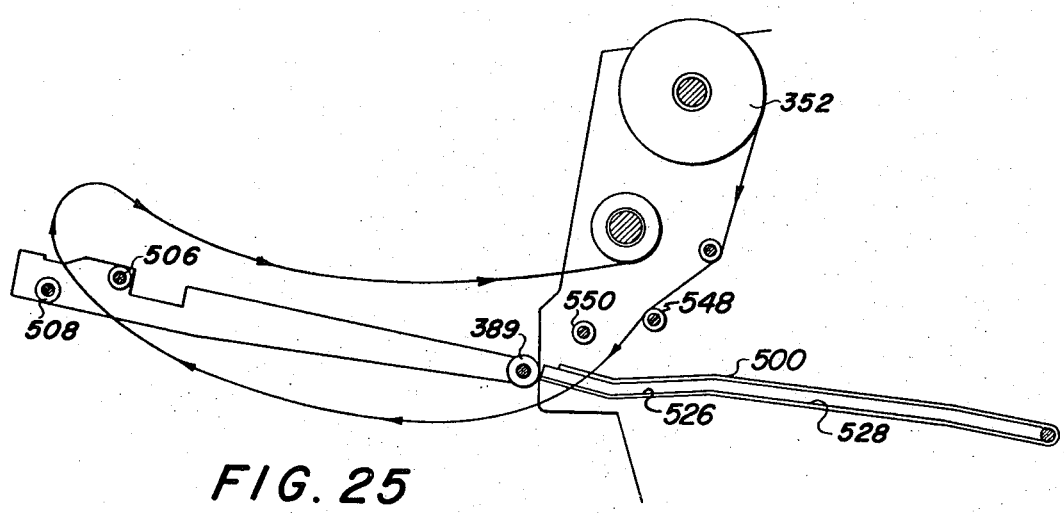
FIGS. 25 and 25a are schematic illustrations of a photoreceptor loading technique.

Along its extent between the supply reel 352 and the take-up reel 353, the photoreceptor is supported, as indicated schematically in FIG. 25, by the support roller 389, a metering roller 548 and a metering roller 550, the metering rollers being journalled in the support structures 362 and 363 in positions so as to cooperate, respectively, with the spring biased rollers 506 and 508 which as pointed out above are carried by the drawer structure 492.

Figure 25A:
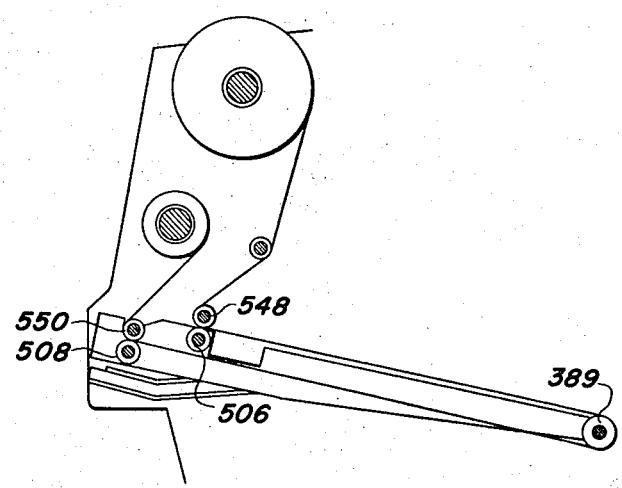

Installation of a new photoreceptor 351 is accomplished by removing the access cover of the apparatus 101 and withdrawing the drawer structure 492 substantially the entire distance of the tracks 500 (see FIGS. 25 and 25a). The leading edge of the photoreceptor which has been taped to an empty photoreceptor spool is dropped downwardly in front of the backup roller 389 and in the back of the metering roll 548.

While holding the leading edge of the photoreceptor in one hand, the drawer structure 492 is moved into the machine thereby causing the photoreceptor to unwind from the supply reel. The leading edge is then inserted between the rollers 506 and 508 supported by the drawer structure with subsequent insertion of the spool, attached to the leading edge, between the yokes 538 and 540. It will be appreciated that at this point the drawer structure 492 has not been completely inserted into the machine; consequently, it is now ready for such movement, where it will be seen that the rollers 506 and 508 respectively engage the metering rollers 548 and 550. In lieu of holding the leading edge of the photoreceptor, the spool taped thereto could be installed between the yokes 538 and 540 prior to movement of the drawer structure into the machine.

Figure 26:
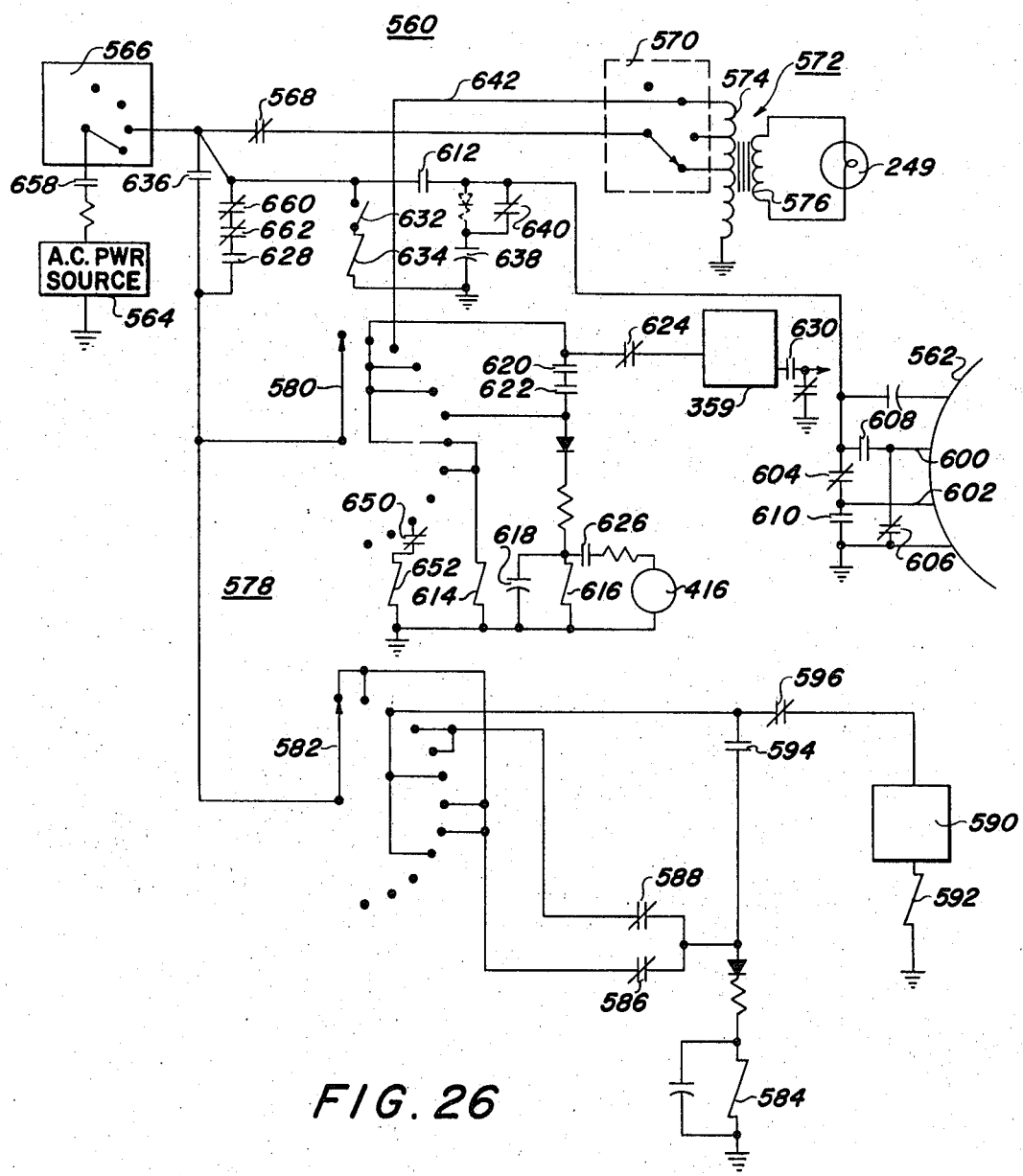
FIG. 26 is a schematic diagram of the control for the machine shown in FIG. 1.

A control circuit schematically illustrated in FIG. 26 and generally indicated by reference character 560 is provided for operating the lamp 249, the corotron power supply 359, the paper feed clutch 416 and drive motor 562 operably mounted intermediate the side support structures 362 and 363. The control 560 is adapted to be provided with conventional AC power from a source 564 by means of a main switch 566.

A normally closed switch 568 and a lamp intensity selector switch 570 and actuator 571 therefor operatively connect the lamp 249 to the source of power 564 through a transformer 572. The transformer comprises a primary winding 574 and a secondary winding 576 the former of which is provided with a plurality of taps to provide various power levels and the latter of which supplies power to the lamp.

Figure 18:
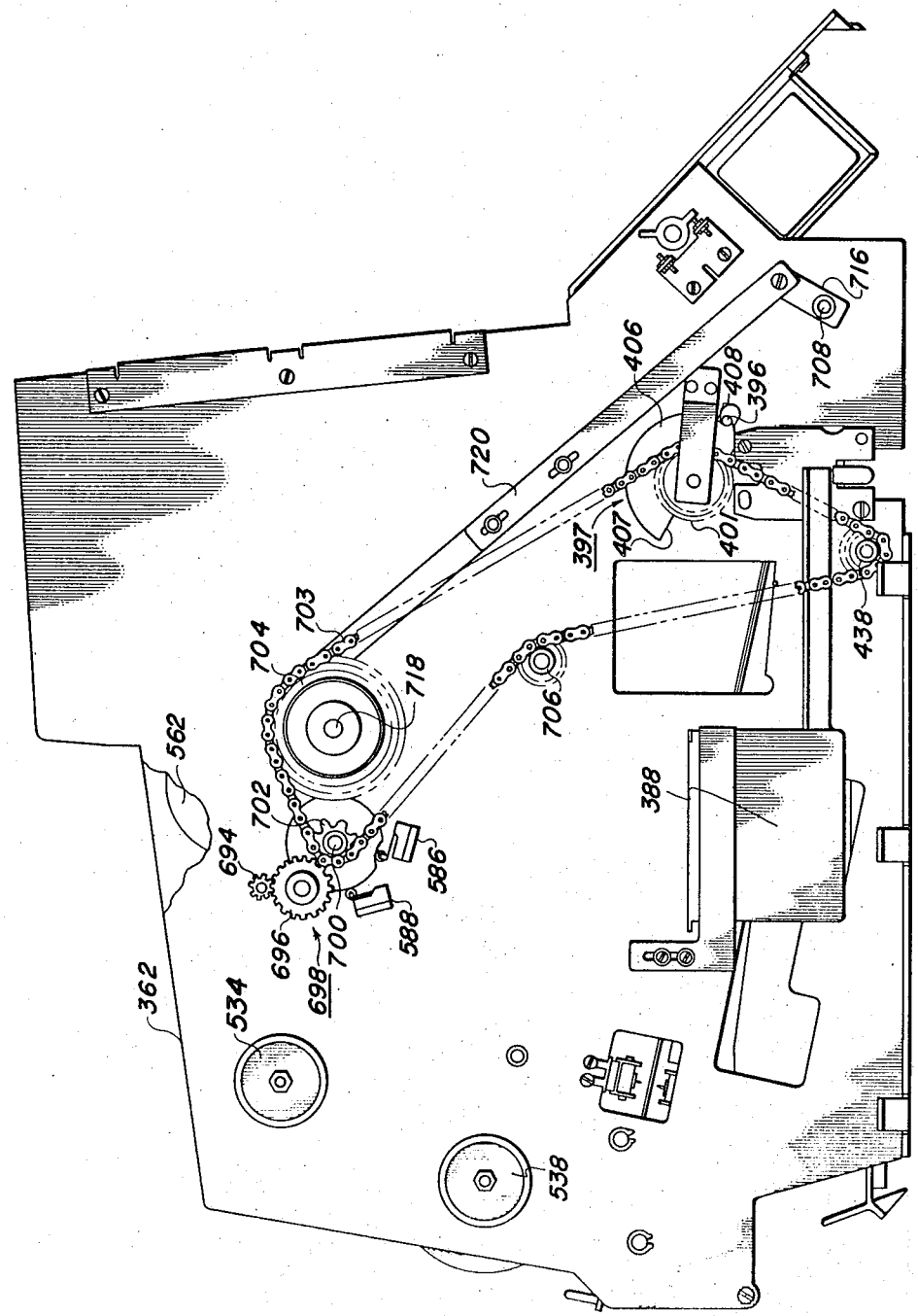
FIG. 18 is a side elevational view of the left support structure of the machine shown in FIG. 1, illustrating a part of the drive system of the copying section of the machine.
Figure 27:
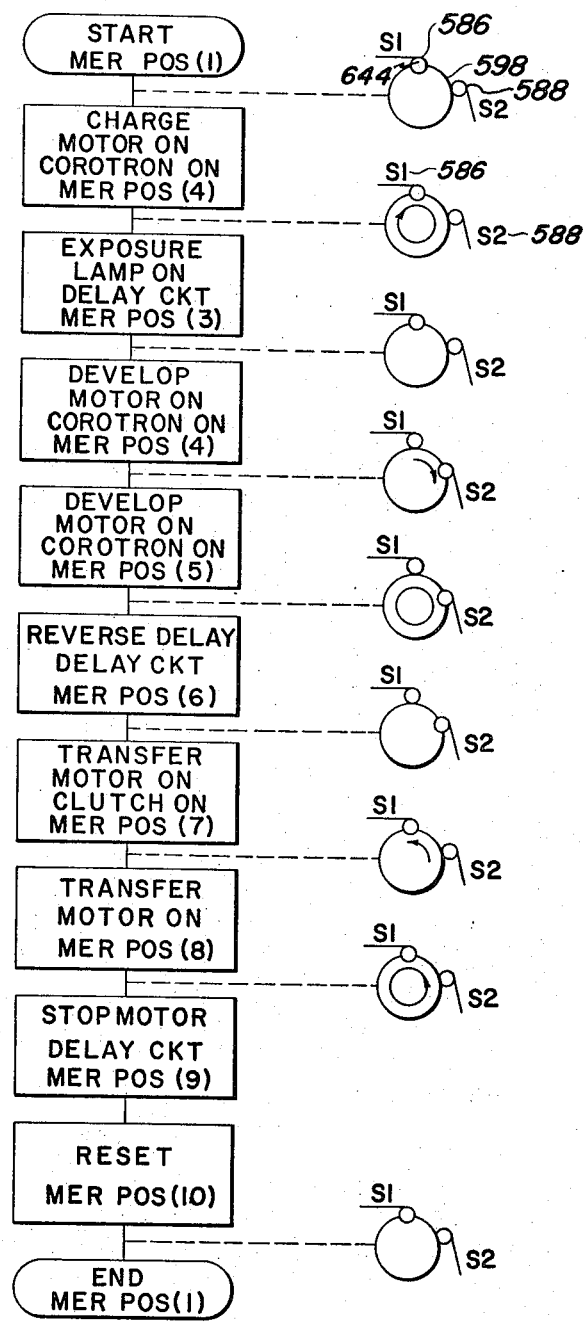
FIG. 27 is a sequential illustration of a timing mechanism forming a part of the control shown in FIG. 26.

A stepper relay switch 578 comprising a pair of poles 580 and 582 is provided for energizing the lamp 249, the power supply 359, the clutch 416 and the motor 562 in a predetermined manner. Each of the poles 580 and 582 is adapted to be physically moved across a set of 12 contacts by means of a step relay 584. The step relay can be directly energized through normally closed switches 586 and 588 or after a delay period accomplished by means of a delay device 590, a relay 592 normally open switch 594 and a normally closed switch 596. The stepping relay 584 is energized through the switch 586 when the pole 582 contacts the first, seventh and eighth contacts associated with the pole 582. Energization of the relay 584 through the switch 588 is accomplished through engagement of the pole 582 with the fourth and fifth contacts associated therewith. The relay 584 may also be energized by means of the relay 592 when the pole 582 contacts the third, sixth and ninth contacts. As shown in FIGS. 18 and 27, a cam 598 mounted for rotation by the shaft of the motor 562, contiguous the side wall structure 362, serves to cycle the switches 586 and 588.

The motor 562 is provided with a pair of taps 600 and 602 by which the motor can be rotated in a forward direction through normally closed switches 604 and 606 and in the reverse direction through normally open switches 608 and 610. The aforementioned switches cooperate with a relay actuated switch 612 which is normally open and is closed by energization of a relay 614 receiving power through the pole 580 and its associated contacts. The motor 562 runs in the forward direction when the pole 580 engages the second, seventh, and eighth contacts, each of which serves to energize the relay 614 and therefore close the switch 612 to the motor 562. A relay 616 adapted to be temporarily energized by a capacitor 618 when the pole 580 moves from the sixth to the seventh contacts, closes the normally open switches 620 and 622 and opens the normally closed switch 624 to permanently lock in the relay 616. A switch 626 in series with the paper clutch 416 is cam actuated when the pole 582 moves from the sixth to the seventh contact.

A print initiation switch 628 and actuator 629 therefor are mounted in the front wall 107; the switch 628 operatively connects the main switch 566 with the stepping switch 578.

While the power supply 359 usually supplies power to the corotrons, it is adapted by means of a normally open switch 630, to supply a bias voltage to the gravure roller 369. A manually actuatable switch 632, supported in the front panel or wall 107, in its closed position provides for energization of a relay 634 which effects closure of the switch 630 in order to supply suitable voltages to the gravure roller for effecting reversal development. It will be appreciated that by means of the switch 632, negative to positive and positive to positive development can be accomplished.

Prior to initiating a print cycle, the apparatus is in the viewing mode, therefore, the poles 580 and 582 are in engagement with their respective first contacts. The lamp 249 which is set by means of the selector switch 570 to the desired viewing intensity is energized through the normally closed switch 568 and the main switch 566.

To initiate a print cycle, the print switch 629 is depressed thereby supplying power to the stepper relay 584 through the pole 582 and the switch 586. This energizes the stepper relay, moving the poles 580 and 582 to position two on the stepping switch. A normally open switch 636 closes thereby shunting the print switch 580 removing it from the circuit, and the lamp 249 turns off. The switch 636 operates off reset mechanism, to be discussed hereinafter, of the stepping switch 578 and remains closed until a reset coil is pulsed.

As can be seen, with the poles 580 and 582 in position two, the relay 614 is energized via the pole 580 thereby closing the switch 612 and providing power to the motor 562 for rotation in the forward direction through switches 604 and 606. Power is simultaneously supplied to the corotron power supply via normally closed switch 624. With the motor 562 running in the forward direction, the photoreceptor 351 is moved forwardly approximately twelve inches whereupon it is charged on its upper and lower surfaces by the corotrons 357 and 358. As the motor turns, the cam 598, as shown in FIG. 27, rotates through an angle of 360° to first open the switch 586 and then close it. It will be seen that the circuit is again made to the relay 584 which effects movement of the poles 580 and 582 to position 3.

In position 3, exposure of the previously charged photoreceptor 351 takes place. In this position the relay 614 is deenergized thereby opening switch 612 which effects braking of the motor 562 through discharging of a capacitor 638 through a normally closed switch 640. Simultaneously, the delay device 590 is energized via switch 596 and pole 582. The lamp 249 again turns on via pole 580 and a conductor 642 which is hard wired to the low intensity tap of the primary winding 574 to insure that the exposure takes place at the low intensity only. The braking of the motor is fast enough so that the switch 586 is still in an indentation 644 of the cam 598 as shown in FIG. 27. When the delay device 590 times out, power is supplied to the relay 592 thereby effecting closure of the switch 594 which serves to energize the relay 584 in order to move the poles 580 and 582 to position 4.

In positions 4 and 5 of the stepping switch 578, the exposed photoreceptor is developed. The photoreceptor during this period is advanced approximately 14 inches. In position 4, the relay 614 is again energized and the motor 562 again rotates in the forward direction. The corotron power supply 359 is again turned on through normally closed switch 624. Energization of the corotron power supply at this point is necessary in order to accomplish the reversal development should the manually operated switch 632 be closed, since the gravure roller bias is derived therefrom. For normal copies, the relay 634 is deenergized as shown in FIG. 26 while for reversal development, the switch 632 is closed thereby activating the relay 634 which closes the switch 630 thereby supplying the required bias to the developer roller 369. The cam 598 rotates about 80° before the switch 588, as shown in FIG. 27 drops into the cam indentation 644. The relay 584 thus receives a pulse via the pole 582 thereby effecting movement of the poles 580 and 582 to position 5 of the stepping switch 578. As can be seen from FIG. 26 the wiring is the same in positions 4 and 5 and thus the machine operation continues uninterrupted. After further revolution of the cam through 360°, the switch 588 again drops into the indentation 644 as can be seen from FIG. 27. It can now be seen that control of the stepping switch by means of the switch 586 and relay 584 allows operation of the machine for a shorter period of time than the switch 588 and relay 584 in order to effect movement of the photoreceptor 351 a lesser amount. It will be apparent from a consideration of the machine configuration particularly in the area of the transfer roller that it is necessary to move the photoreceptor a greater distance during the development portion of the cycle. At this time the relay 584 again receives a pulse through the switch 588 thereby effecting movement of the poles 580 and 582 to position 6.

Prior to transferring an image from the photoreceptor 351 it is desirable to bring the motor 562 to a complete stop before reversing its direction of rotation. The foregoing avoids large transients in the motor power and thus is safer for circuit elements used in the motor control, i.e., relays 614 and 616. In order to accomplish the stopping of the motor, in switching from forward to reverse rotations, with a minimum number of components the exposure delay device 590 is used. When the pole 582 moves to position 6, the relay 614 is deenergized thereby effecting motor braking as discussed hereinabove through the discharge of the capacitor 638 through the switch 640. The braking is fast enough so that the cam switch 588 is still in the indentation 644, the exposure delay device 584 being energized via the pole 582 and the sixth contact of the stepper switch. The relay 616 is energized with a delayed turn-on due to the arrangement thereof with respect to the capacitor 618, the delay being provided so that the motor braking capacitor 638 can be completely discharged before the relay contacts 620, 622, and 624 change polarity. The energization of the relay 616 sets the motor 562 for reverse drive through the switches 608 and 610 and deenergizes the corotron power supply 359 through opening of the switch 624. When the delay device 590 times out, power is made available to the relay 592 closing switch 594 to permit pulsing of the relay 584 thereby effecting movement of the poles 580 and 582 to position 7 of the stepping switch 578.

In the copy transfer mode or portion of the machine cycle the developed image is transferred to plain sheets of copy paper. The photoreceptor 351 in this mode is moved in a reverse direction approximately 14 inches. This is a two-position mode similar to positions 4 and 5 of the stepper switch due to the 14 inch travel of the photoreceptor. In moving to position 7, the switch 626 which is closed by a cam of the stepper switch 578 closes and the paper feed clutch 416 receives power from the discharge of the capacitor 618 which also energizes the relay 616 thereby changing the state of the switches 620, 622, and 624 to lock in the relay 616 through the switches 620 and 622. In the seventh position, the relay 614 is again energized and the motor 562 receives power via the switch 612. The cam rotates approximately 80° and the switch 586 drops into the indentation 644 as shown in FIG. 27, position 7. The relay 584 receives a pulse via the pole 582 and the switch 586 thereby effecting movement of poles 580 and 582 to position 8 of the stepper switch 578. When the pole 580 moves to position 8, the switch 626 opens and the paper feed clutch 416 is deenergized. The machine operation continues otherwise uninterrupted during this transition from position 7 to 8. After one complete rotation from position 7, the cam switch agains drops into the indentation 644 whereupon the coil 584 is again pulsed via the switch 588 and the pole thereby effecting movement of the step of the pole 580 and 582 to position 9.

In positions 9 and 10 of the stepper switch 578, the copy has been delivered so the machine is stopped and the circuitry set back to the home position and made ready for another print cycle. In moving to position 9 the relay 614 is deenergized and the motor brakes, stopping the cam 598 with the switch 586 in the indentation 644. The delay device 590 is activated so that the motor 562 and associated mechanism can come to rest before resetting the control circuits. Once the delay device 590 times out, power is again available to the relay 584 providing a pulse via the switch 594 to effect movement of the poles 580 and 582 to position 10. In this position, a normally closed switch operates off the step coil armature and opens while movement of the pulse 580 and 582 from position 9 to position 10 is in progress. When this movement is completed, the switch 650 closes and a reset coil 652 is energized thereby effecting return of the poles 580 and 582 to position 1. When the reset coil 652 is activated, the switch 568 returns to the state shown in FIG. 26 for removing power from the poles 580 and 582 and supplying power to the transformer 572 to thereby reenergize the lamp 249. The switch 568 stays in this state until the relay 584 is again energized. The relay 616 is deenergized after a delay. The control circuitry is now in a state shown in FIG. 26 with the lamp 249 on, in the view mode and ready for another print cycle.

It will be appreciated that the quality of microfilmed materials varies substantially, consequently, the quality particularly, in terms of contrast between light and dark areas of the film varies quite appreciably. Accordingly, a variable resistance component herein disclosed as a potentiometer 654 is provided to operate in conjunction with the delay device 590 to thereby vary the exposure period in accordance with the desires of the operator. An exposure control knob 656 is provided for actuating the potentiometer 654.

It may further be appreciated that operaion of the machine 101 at certain times is not desirable, for example, when the access cover 104 is removed or when the paper or photoreceptor material has been exhausted. Accordingly, as shown in FIG. 26 an access cover switch 658 is provided in order to render the machine inoperable while the cover is removed. Likewise, a pair of interlock switches 660 and 662 are provided to render the machine inoperative at times when the photoreceptor and paper supplier are merely exhausted.

OPERATION

Prior to actual utilization of the machine 100, it will be necessary to select a film containing information in an area of interest. Where such information is stored in the form of microfilm on individual reels, for example, recently issued U.S. patents, a reel containing a particular patent is chosen from a storage area. The reel is placed on the spindle 122 (FIG. 1), usually prior to installation of the module 116, and then attached to the take-up reel. The module 116 can thus be inserted into the grooves 113 and 114 after the large housing has been pivoted upwardly by means of the handle 245. With the lamp housing moved back to its operating position the machine is made ready for operation through manipulation of the actuator 571 (FIG. 1) which provides a circuit to the lamp selector switch 570 (FIG. 26) through the main switch 566 which is actuated simultaneously with the switch 570. Depending upon the condition of the film and/or the desires of the operator the brightness of the lamp may be set at a low, medium or high intensity. With the lamp 249 energized an image is projected onto the screen 111. At this point it can visually be determined whether the film 244 is properly positioned relative to the projection system. Exact vertical centering of an image on the screen can be attained through sliding movement of the module 116 in the grooves 113 and 114. Horizontal centering of the image is accomplished by means of a control knob 670 which is operatively coupled to one of the motor output shafts of the film transport mechanism.

Advancement of the film 244 is accomplished through manipulation of the actuator 220. Movement of the actuator to the left, as viewed in FIG. 1, will effect movement of the film from right to left while reverse movement of the actuator will cause the film to move in the left to right direction. Energization of the film transporting motors 208 and 209 is obtained through the cam activated switches 223, 224 and 225 (FIG. 7A) the latter of which cooperates with either one or both of the former to establish circuits to either the motor 208 or 209 independently or simultaneously. The switch 225 is normally open while the switches 223 and 224 are normally closed. It is now seen (FIG. 7A), therefore, that slight rotation either clockwise or counterclockwise will effect closure of the switch 225 while the switches 223 and 224 remain closed. At this time both motors 208 and 209 are running, and there is no braking action; consequently, the output of the differential is zero causing the motors to run at different speeds resulting in movement of the film at a relatively low speed as described hereinabove. Still further rotation of the actuator 220 will cause one or the other of the switches 223 or 224 to open the circuit to the motor being braked to thereby prevent overloading thereof. It will be appreciated that when one of the motors is deenergized the fiber will be rapidly transported past the lamp housing 112. Accordingly, the film may be transported either very quickly or very slowly.

In some instances, depending on the orientation of the image upon the film and the condition of the film, the projected image will be improperly oriented on the screen and appear somewhat fuzzy. Turning of the format control knob 287 will effect proper image orientation while manipulation of the focusing knob 276 will produce a clear image.

Prior to initiating a print cycle the type of image (i.e., positive or negative) is noted. If the opening on the screen image is negative, the switch 632 is closed through movement of the actuator button 632, that is, if a positive print or copy is desired. When the image is negative, the foregoing operation is followed by the depressing of the print bar 629 to thereby close the switch 628 (FIG. 26).

Closure of the switch 628 changes the state of the switches 568 and 636 to turn off the lamp 249 and to establish the circuit to the step switch 578 via the switch 636. Energization of the step relay 584 takes place thereby moving the poles 580 and 582 to the second contacts establishing a circuit to the motor 562 through the relay activated switch 612. The motor rotates in the forward direction which, as viewed in FIG. 19, is in the counterclockwise direction. The motor shaft is drivingly connected to a sprocket 672 which is in turn drivingly connected to a pair of sprockets 674 and 676 by a chain 678 in such a manner that the yoke 536 rotates counterclockwise and the yoke 540 moves clockwise to effect movement of the photoreceptor (see FIG. 17) from the supply spool 352 to the take-up spool 353. The path over which the photoreceptor material moves is such that it passes between the upper and lower corotrons 357 and 358 for charging thereof. An idler sprocket 680 is provided in order to produce the desired motions for the take-up and supply reels.

On the same side of the machine 100 (i.e., adjacent the side support structure 363) another chain drive 686 serves to drive: the sprocket 413 of the paper feed shaft, sprockets 688 and 690 drivingly attached to the metering rollers 548 and 550, a pair of idler sprockets 682 and 684 and a developer feed roll sprocket 692. Motion is transferred from the motor 562 via an idler member 694 carried by the same shaft as the sprocket 672. Since the switch 416 is deenergized at this time the sprocket 413 is ineffective to rotate the paper feed shaft 409. The rotation of the feed roller 371 serves to prime the applicator roll 369.

As viewed in FIG. 18, the output shaft at the opposite side of the motor 562 carries an output pinion 694 which meshes with an idler gear 696 of a gear train 698. An idler gear (not shown) carried by the same shaft as the gear 696 meshes with a gear (not shown) carried by a shaft 700 on which a drive sprocket 702 is carried. The sprocket 702 is drivingly connected by means of a chain 703 to a sprocket 704 associated with the tiltable mirror 386, an idler sprocket 706, the sprocket 438 carried by the transfer roll cam shaft 439 and the sprocket 401 of the developer system. During forward movement of the motor (i.e., clockwise rotation of the sprocket 704 as viewed in FIG. 18) the sprocket which is secured to the shaft of the tiltable mirror 286 by means of a slip clutch (not shown) serves to tilt the mirror in order that the projected image from the film 244 strikes the photoreceptor 351.

A baffle structure generally indicated 705 comprises a pivotable member 706 (FIG. 2) carried by a shaft 708 (FIG. 18) suitably journalled in the support structures 362 and 363. The baffle structure further comprises a pair of plate members 710 and 712 carried by the mirror support structure 714. The members 706, 710, 712 and 714 which cooperate to prevent unwanted light striking the photoreceptor 351 are automatically moved into position, when the mirror is tilted forward. This is accomplished by means of a pair of crank arms 716 (only one being shown) rigidly attached to the shaft 708 (FIG. 18) and the shaft 718 supporting the mirror 286. An arm structure 720 operatively interconnects the crank arms in order to couple the shaft 708 to the shaft 718 for movement therewith. Pairs of opposed stops 722 and 724 carried on the inside of the support structures 362 and 363 define the angle through which the mirror can rotate.

Once a sufficient length of the photoreceptor has been changed and the mirrror is in position to project an image onto the photoreceptor, the poles 580 and 582 are moved to their respective third contacts, and the lamp 249 is energized via the low intensity top and the pole 580 while a circuit is established to the delay drive 590 across the pole 582. The delay device times out in accordance with the setting of the potentiometer 654 and thereby controls the exposure duration. the timing-out of the device is effective to energize the relay 564 causing the poles to move to the fourth contact where the motor is again energized. The developer cam 397 is rotated such that the low side 407 thereof engages the cam follower 396 which allows the developer module to rotate counterclockwise as viewed in FIG. 18 whereby the gravure roll 369 is spring biased into contact with the photoreceptor 351 for development of the latent electrostatic image thereon.

After development, the image is transferred from the photoreceptor 351 to a sheet of plain paper which is fed toward the front of the machine where it exits through an opening 726. At this time the motor 562 is running in the reverse direction and the paper feed clutch 416 is energized. The transfer roller cam is rotated in the counterclockwise direction as viewed in FIG. 17 to thereby allow biasing of the transfer roll upwardly during image transfer. The mirror and the baffle structure are moved back to their viewing positions due to the reverse running of the motor. The machine is again ready for initiation of a print cycle.

We claim:

1. A copying machine, comprising:
   a photosensitive member in the form of an elongated web supported for movement past an exposure station by a supply reel and a take-up reel;
   housing structure including means for supporting the supply and take-up reels and a plurality of guide rolls;
   removable support structure insertable into said housing structure and removable therefrom; and
   a plurality of guide rolls carried by said removable support structure, said guide rolls carried by said support structure cooperating with said guide rolls supported by said housing structure to guide and support the photosensitive member for movement within said housing structure.

2. Structure as specified in claim 1 wherein,
   each of the guide rolls of said housing structure cooperating with guide rolls carried by said support structure cooperates with a single guide roll of said support structure to thereby form pairs of guide rolls.

3. Structure as specified in claim 2, further including resilient means associated with at least one roll of each pair of guide rolls for biasing of said at least one guide roll into engagement with the other roll of that pair of guide rolls.

4. Structure as specified in claim 2 including,
   a guide roll carried adjacent the leading edge of said removable support structure for supporting said photosensitive web adjacent a developer applicator.

5. Structure as specified in claim 1 wherein, said guide rolls supported by said removable support structure are in spaced apart relationship to allow passage of said take-up reel therebetween.

6. Method of installing a photosensitive material into reproducing apparatus, said method including the steps of:
installing a reel containing a new supply of photosensitive material into said apparatus;
passing the free end of said material between a pair of spaced apart guide rolls carried by a photosensitive support structure;
securing the remote end of said photosensitive material in said apparatus; and
inserting said photosensitive material support structure into a housing forming part of the apparatus.

7. The method of claim 6 wherein, the step of installing comprises placing a take-up reel attached to the free end of said material in cooperative engagement with drive yokes carried by said apparatus.

8. In reproducing apparatus in combination, housing structure having opposed walls with guide rail members carried thereby;
a supply reel and a take-up reel for reproducing material;
means for supporting said reproducing material intermediate said supply reel and said take-up reel;
said supporting means comprising a plurality of quide rails extending along said opposed walls intermediate thereof;
a removable drawer structure supported by said guide rails; and
a plurality of guide rolls supported by said drawer structure cooperating with guide rolls supported intermediate said opposed walls for guiding and supporting said material for movement between said supply reel and said take-up reel.

9. Structure as specified in claim 8 wherein, each of the guide rolls supported by said opposed walls cooperates with one of the guide rolls carried by said drawer structure to sandwich said reproducing material therebetween.

10. Structure as specified in claim 9 further including a means associated with at least one guide roll of each pair for biasing said roll into engagement with the other roll of the guide roll pair.

11. Structure as specified in claim 8 including, a backup roll carried adjacent the leading edge of said removable drawer structure for supporting a portion of said reproducing material adjacent a developer applicator.

12. Structure as specified in claim 8 wherein, said guide rolls supported by said removable drawer structure are in a spaced apart relationship for allowing passage of said take-up reel therebetween.

13. Structure as specified in claim 11 including a backup roll carried adjacent the leading edge of said removable drawer structure for supporting a portion of said reproducing material adjacent a developer applicator.

14. Structure as specified in claim 13 wherein, said guide rolls supported by said removable drawer structure are spaced apart for allowing passage of said take-up reel therebetween.

* * * * *